United States Patent
Araki et al.

(10) Patent No.: US 6,351,333 B2
(45) Date of Patent: *Feb. 26, 2002

(54) OPTICAL ELEMENT AND OPTICAL SYSTEM HAVING THE SAME

(75) Inventors: Keisuke Araki; Sadahiko Tsuji; Tsunefumi Tanaka, all of Yokohama; Kenichi Kimura, Kawasaki; Norihiro Nanba, Kawasaki; Hiroshi Saruwatari, Kawasaki; Michiharu Aratani, Kawasaki; Takeshi Akiyama, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/152,321

(22) Filed: Sep. 14, 1998

(30) Foreign Application Priority Data

Sep. 16, 1997 (JP) ............................................... 9-269358

(51) Int. Cl.⁷ ............................ G02B 27/44; G02B 5/18
(52) U.S. Cl. .................... 359/566; 359/570; 359/572; 359/574; 359/630; 359/631; 359/633; 359/356; 359/676; 359/730
(58) Field of Search ................................. 359/630, 631, 359/633, 365, 366, 668, 669, 676, 678, 720, 727, 728, 730, 731, 737, 729, 833, 834, 837, 863, 566, 570, 572, 574

(56) References Cited

U.S. PATENT DOCUMENTS

| | | | |
|---|---|---|---|
| 4,669,810 A | 6/1987 | Wood | 350/3.7 |
| 4,711,512 A | 12/1987 | Upatnieks | 350/3.7 |
| 4,763,990 A | 8/1988 | Wood | 350/320 |
| 4,775,217 A | 10/1988 | Ellis | 350/538 |
| 4,799,765 A | 1/1989 | Ferrer | 350/174 |
| 5,453,877 A | 9/1995 | Gerbe et al. | 359/633 |
| 5,699,186 A | * 12/1997 | Richard | 359/569 |
| 5,768,025 A | 6/1998 | Togino et al. | 359/633 |
| 5,790,311 A | 8/1998 | Togino | 359/630 |
| 5,790,312 A | * 8/1998 | Togino | 359/631 |
| 5,963,376 A | * 10/1999 | Togino | 359/676 |
| 6,021,004 A | 2/2000 | Sekita et al. | 359/676 |
| 6,166,866 A | 12/2000 | Kimura et al. | 359/729 |

FOREIGN PATENT DOCUMENTS

| | | |
|---|---|---|
| EP | 0 566 001 | 10/1993 |
| EP | 0 766 115 | 4/1997 |
| EP | 0 790 516 | 8/1997 |
| JP | 9-65245 | 3/1997 |
| JP | 9-65246 | 3/1997 |
| JP | 9-197337 | 7/1997 |

OTHER PUBLICATIONS

Patent Abstracts of Japan, vol. 1997, No. 07 (JP 9–65245, Mar. 7, 1997), Jul. 31, 1997.
Patent Abstracts of Japan, vol. 1997, No. 07 (JP 9–65246, Mar. 7, 1997), Jul. 31, 1997.
Patent Abstracts of Japan, vol. 1997, No. 11 (JP–197337, Jul. 31 1997), Nov. 28, 1997.
"Off–Axial", the Paraxial Theory for Off–Axial Optical Systems, K. Araki, 20th Optical Optics Symposium Lectures, pp. 49–56, with Program.

\* cited by examiner

*Primary Examiner*—Darren Schuberg
*Assistant Examiner*—Leo Boutskaris
(74) *Attorney, Agent, or Firm*—Fitzpatrick, Cella, Harper & Scinto

(57) ABSTRACT

An optical element includes an incidence surface, one or more reflecting surfaces reflecting light from the incident surface, an emergence surface, and off-axial curved surfaces causing the light to emerge from the emergence surface. At least one of the incidence surface, the emergence surface and the one or more reflecting surfaces is a surface having diffracting action. The surface having the diffracting action is a curved surface.

34 Claims, 17 Drawing Sheets

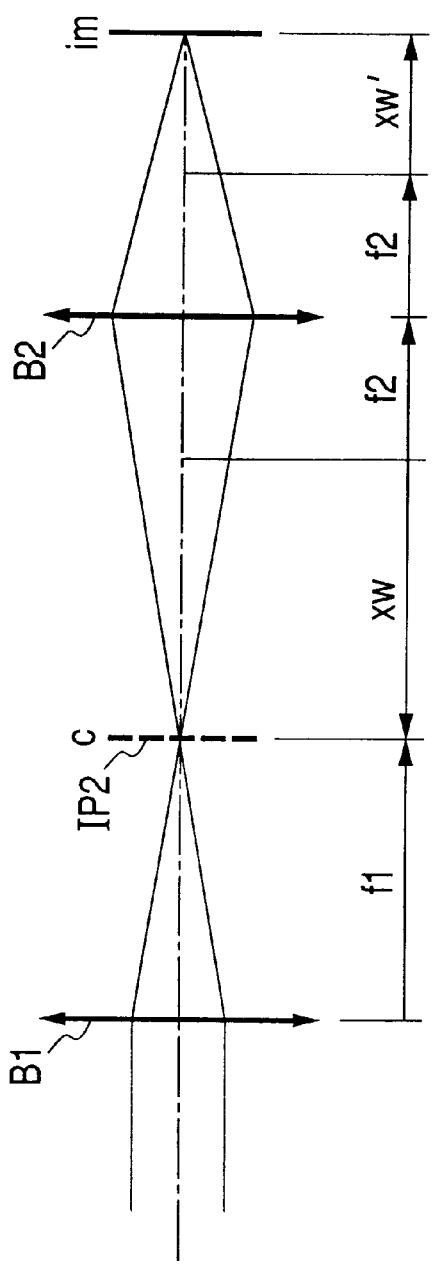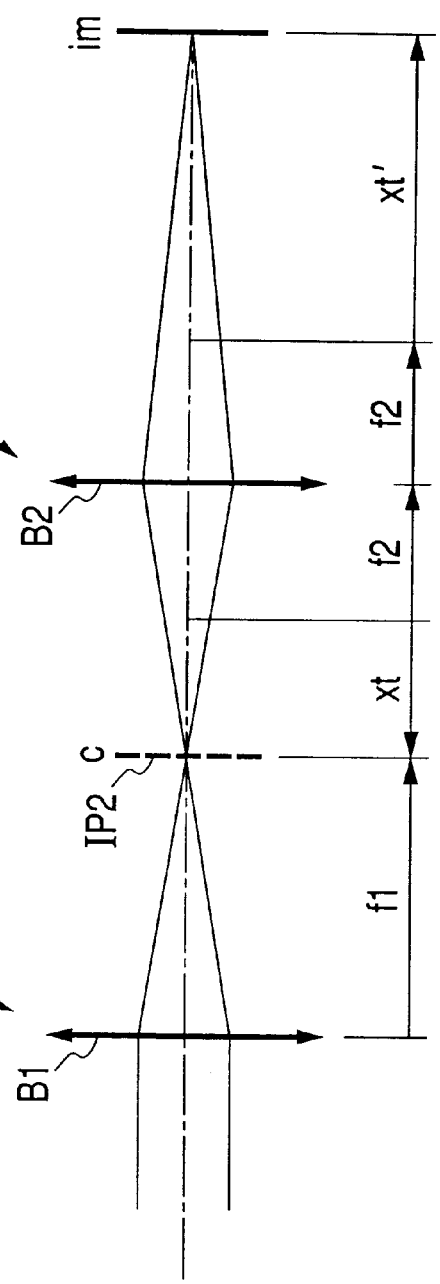
FIG. 6A
FIG. 6B

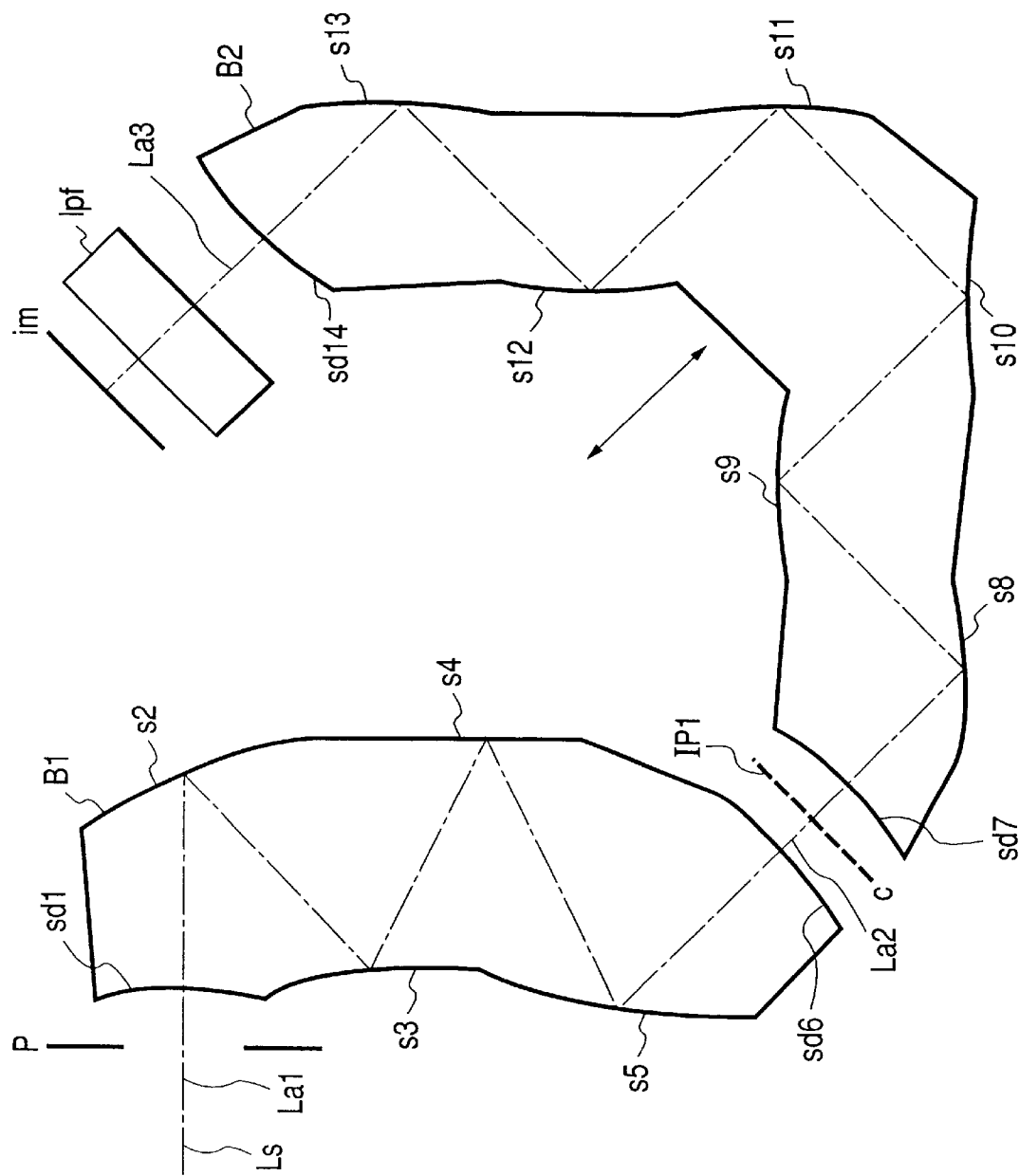

OPTICAL ELEMENT AND OPTICAL SYSTEM HAVING THE SAME

BACKGROUND OF THE INVENTION

1. Field of the Invention

This invention relates to an optical element and an optical system having the optical element, and is particularly suitable for the optical system of a video camera, a still camera, a copying apparatus or the like, designed to form an object image on a predetermined surface by the use of an optical element (off-axial optical element) including a curved surface (off-axial curved surface) which is not a flat surface, in which a normal plane does not coincide with a reference axis at a point at where an optical path (reference axis) of a reference wavelength leading from an object plane to an image plane intersects the curved surface of the element.

2. Related Background Art

A coaxial optical system in which a rotation-symmetrical refracting surface or reflecting surface is disposed about an optical axis, which is the rotation-symmetry axis of each surface (a refracting surface or a reflecting surface), has heretofore been used chiefly as an optical system for forming the image of an object on an image plane. Recently, however, an optical system of a new concept, i.e., an off-axial optical system which does not fall within the category of the conventional coaxial optical system and which includes a curved surface (off-axial curved surface) which is not a flat surface, in which a normal plane does not coincide with a reference axis at a point at where an optical path (reference axis) of a reference wavelength leading from an object plane to an image plane is introduced, for example, in pages 49 to 56 of the 20th Optics Symposium Lectures.

Such an off-axial optical system, in contrast with the conventional coaxial optical system, can be defined in a form wherein the reference axis (corresponding to the optical axis of the conventional coaxial optical system) is bent, and the conventional coaxial optical system can be considered to be a special case of this off-axial optical system. Therefore, the degree of freedom of the disposition of the optical system can be increased and besides, the variations of the optical system are expected to become more than those of the coaxial optical system.

On the other hand, as an example in which a diffraction optical element utilizing a diffraction phenomenon is applied to an eccentric optical system (generally, being eccentric refers to a case where the rotation-symmetry axis of a surface which is the "core" is parallel-shifted or is tilted about a certain point, and the eccentric optical system is generally a special example of an off-axial optical system in which an expression representing a surface is constituted by a surface having no rotation-symmetry axis including even the area outside an effective portion), there is an example in which a reflection type hologram is attached to the combiner of the head-up display of an aircraft or an automobile shown in U.S. Pat. Nos. 4,669,810, 4,763,990, 4,799,765, etc.

For such an optical system (off-axial optical system), however, it becomes necessary to take rotation-asymmetrical aberrations which did not need to be considered in the coaxial optical system due to its rotation-symmetry. Therefore, it is necessary that an expression expressing a surface shape be an expression expressing a rotation-asymmetrical shape and the surface shape becomes incapable of being formed by a simple shape such as a rotation-symmetrical surface.

Also, by making the expression of the surface shape into a rotation-symmetrical one, the degree of freedom of the design as the coefficient of the surface shape per surface is increased. However, the number of asymmetrical aberrations to be corrected is also increased and therefore, the total number of refracting surfaces and reflecting surfaces required for aberration correction need be about equal to that in the coaxial system.

Also, in the example introduced in the above cited reference wherein a reflection-type hologram is attached to the combiner of the head-up display of an aircraft or an automobile, all the optical systems are observation optical systems and the number of surfaces used is limited to about two. Therefore, the optical performance for chromatic aberration or the like has not always been satisfactory.

Also, in the above-described example wherein a reflection-type hologram is attached to the combiner of the head-up display of an automobile, the surface (element) having the diffracting action is virtually singly installed on a space, and to obtain high optical performance, it is necessary to exactly effect optical adjustment, such as the alignment, with other optical element.

SUMMARY OF THE INVENTION

The present invention has as its object the provision of an optical element and an optical system which are compact and can easily obtain high optical performance.

The present invention is (1-1) an optical element for reflecting light from an incidence surface by one or more reflecting surfaces comprising off-axial curved surfaces and causing the light to emerge from an emergence surface or an optical system having this optical element, in which at least one of the incidence surface, the emergence surface and the reflecting surface diffracts the light (by a diffraction grating thereon).

The present invention is (1-2) an optical element in which a refracting surface of the optical element (an incidence surface) on which a light is incident, one or more reflecting surfaces having off-axial curved surfaces for reflecting the incident light beam, and a refracting surface of the optical element (an emergence surface) from which the light beam reflected by the one or more reflecting surfaces emerges, are formed integrally with one another or an optical system having this optical element, wherein at least one of the incidence surface, the emergence surface, and the reflecting surface diffracts the light (by a diffraction grating thereon).

Particularly, in the construction (1-1) or (1-2), there are aspects characterized in that (1-2-1) the surface having the diffracting action is a curved surface, (1-2-2) the surface having the diffracting action is a spherical surface, (1-2-3) the surface having the diffracting action is a rotation-symmetrical aspherical surface, (1-2-4) the surface having the diffracting action is a rotation-asymmetrical aspherical surface, (1-2-5) the surface having the diffracting action is a hologram type diffracting surface, (1-2-6) the surface having the diffracting action is a kinoform type diffracting surface, (1-2-7) the surface having the diffracting action is a binary type diffracting surface, (1-2-8) the surface having the diffracting action is a diffracting surface having a rotation-asymmetrical striped shape, (1-2-9) the optical path is divided into a plurality of paths by the order of the diffracting action of the surface having the diffracting action, and (1-2-10) it has a plurality of focal lengths differing depending on the order of the diffracting action of the surface having the diffracting action.

A certain optical system of the present invention is
(2-1) an optical system constituted by a plurality of optical elements and provided with at least one optical element of the construction (1-1) or (1-2).

Particularly, there are aspects characterized in that
(2-1-1) the optical element is moved, whereby the focal length of the total system is changed,
(2-1-2) the optical element is moved along a reference axis,
(2-1-3) it is provided with a coaxial optical element,
(2-1-4) the coaxial optical element is moved, whereby the focal length of the entire system is changed, and
(2-1-5) the coaxial optical element is moved along the reference axis. A certain optical element of the present invention is (3-1) an optical element for causing a light beam to enter an incidence surface, reflecting the light beam from the incidence surface by one or more reflecting surfaces, and causing the light beam to emerge from an emergence surface and in which at least one of the incidence surface, the emergence surface, and the one or more reflecting surfaces is a surface having the diffracting action and formed with rotation-asymmetrical stripes.

A certain optical system of the present invention includes
(4-1) at least one optical element of the construction
(3-1) and forms an object image on a predetermined surface through the optical element.

BRIEF DESCRIPTION OF THE DRAWINGS

FIGS. 6A and 6B are illustrations of the paraxial refractive power disposition of FIG. 5.

FIG. 7 is a schematic view of the essential portions of Embodiment 6 of the present invention.

DESCRIPTION OF THE PREFERRED EMBODIMENTS

Before starting the description of several embodiments of the present invention, a description will be provided of the way of representing the constituent elements of the embodiments and common items of all embodiments. The present embodiment, which will be described later, is a qualitative one, and this is for the reason that an optical element having the diffracting action, such as a hologram, is included in the interior of an optical system, and therefore an optical path can be freely set without resorting to a surface shape.

Figure 18:
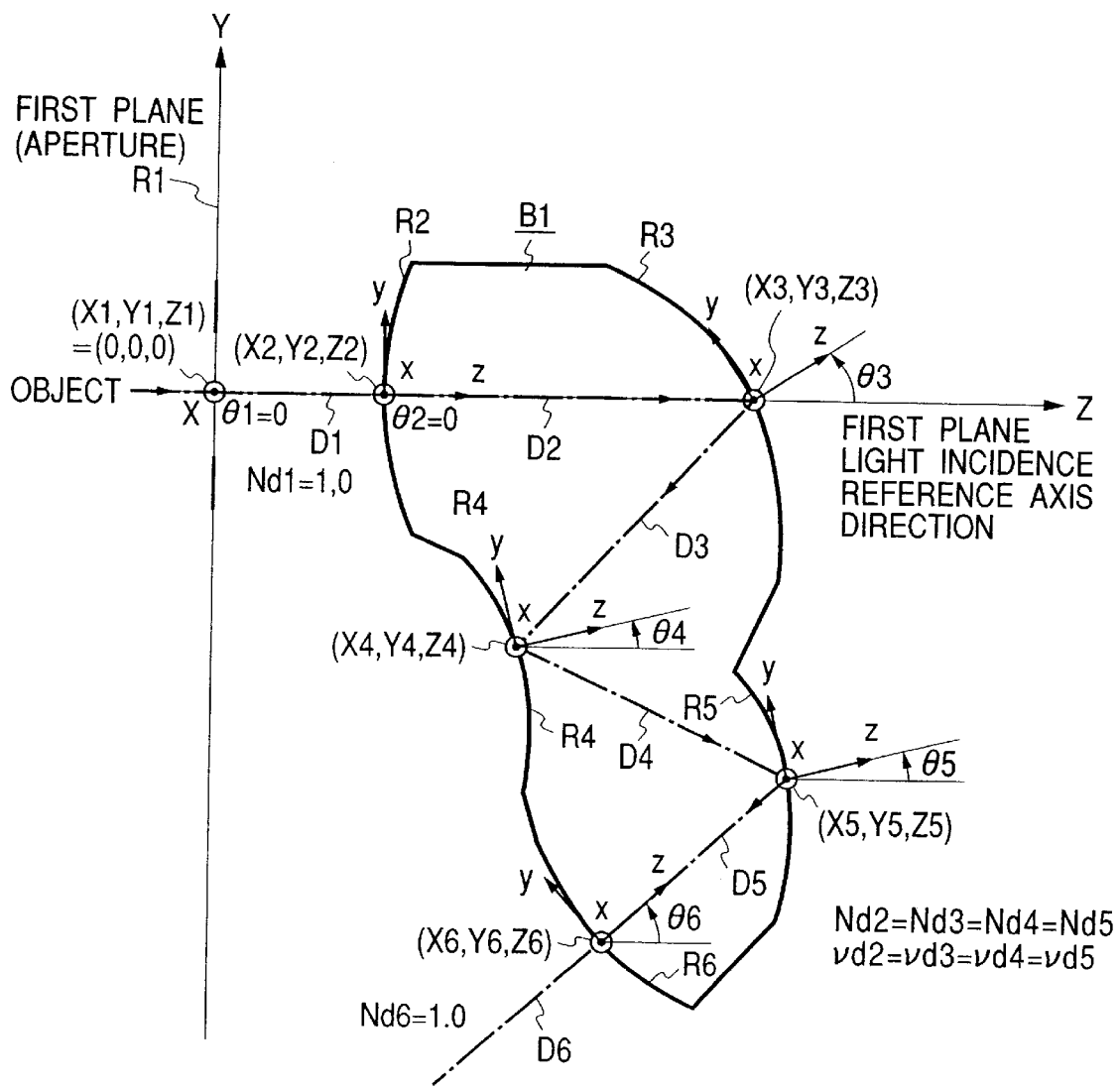
FIG. 18 is a conceptional illustration of a coordinates system and a reference axis defining the off-axial optical system of the present invention.

FIG. 18 is an illustration of a coordinates system defining the construction of an off-axial optical system (optical element). In the embodiments of the present invention, it is to be understood that the ith plane along the direction of travel of a ray of light (indicated by dot-and-dash line in FIG. 18 and called the reference axis ray of light) travelling from the object side to the image plane is the ith plane.

In FIG. 18, the first plane R1 is an aperture, the second plane R2 is a refracting surface coaxial with the first plane, the third plane R3 is a reflecting surface tilted with respect to the second plane R2, the fourth plane R4 and the fifth plane R5 are reflecting surfaces shifted and tilted with respect to the preceding plane, and the sixth plane R6 is a refracting surface shifted and tilted with respect to the fifth plane R5. The second plane R2 to the sixth plane R6 are constructed on an optical element formed of a medium such as glass or plastic, and in FIG. 1, the optical element is a first optical element B1.

Accordingly, in the construction of FIG. 18, the medium from an object plane, not shown, to the second plane R2 is air, the medium from the second plane R2 to the sixth plane R6 is a certain common medium, and the medium from the sixth plane R6 to a seventh plane R7, not shown, is air.

The optical system of the present invention is an off-axial optical system (optical element) i.e., an optical system (optical element) in which at a point at where an optical path (reference axis) of a reference wavelength leading from an object plane to an image plane intersects a curved surface, a normal plane includes a curved surface (off-axial curved surface which is not a flat plane) which does not coincide with the reference axis and therefore, the surfaces constituting the optical system (optical element) have no common optical axis. So, in the embodiments of the present invention, an absolute coordinate system having the center of the effective diameter of the ray of light on the first plane as the origin is first set.

In the embodiments of the present invention, the center point of the effective diameter of the ray of light on the first plane is defined as the origin and also, the path of a ray of light (reference axis ray of light) passing through the origin and the center of the final imaging plane is defined as the reference axis of the optical system. The reference axis in the present embodiment has a direction. The direction is a direction in which the reference axis ray of light travels in case of imaging.

While in the embodiments of the present invention, the reference axis which is the reference of the optical system is set as described above, the axis which is the reference of the optical system can be determined by adopting an axis convenient in optical design, in the arrangement of aberrations, or in expressing the shape of each surface constituting the optical system. Generally, however, the path of a ray of light passing through the center of the image plane, and one of the aperture, the entrance pupil, the exit pupil, the center of the first plane of the optical system, and the center of the last plane of the optical system is set as the reference axis which is the reference of the optical system.

That is, in the embodiments of the present invention, the route along which a ray of light (reference axis ray of light) passing through the center point of the first plane, i.e., the effective diameter of the ray of light on the aperture plane to the center of the final imaging plane, is refracted and reflected by each refracting surface and reflecting surface, is set as the reference axis. The order of the respective surfaces is set to the order in which the reference axis ray of light is subjected to refraction and reflection.

Accordingly, the reference axis finally reaches the center of the image plane while changing its direction along the order of the respective surfaces in accordance with the law of refraction or reflection.

As regards the constituent surfaces of the optical system according to each embodiment of the present invention, for simplicity, the constituent tilted surfaces are all basically tilted in the same plane. So, the axes of the absolute coordinates system are defined as follows:

Z-axis: the reference axis passing through the origin toward the second plane R2

Y-axis: a straight line passing through the origin and forming 90° counter-clockwisely in the tilted plane (the plane of the drawing sheet of FIG. 18) with respect to the Z-axis X-axis: a straight line passing through the origin and perpendicular to the Z-axis and the Y-axis (a straight line perpendicular to the plane of the drawing sheet of FIG. 18)

Also, to represent the surface shape of the ith surface constituting the optical system, it is easier to understand in recognizing the shape to set a local coordinate system, having as the origin a point at which the reference axis and the ith surface intersect each other, and to represent the surface shape of the surface by the local coordinate system than to represent the shape of the surface by an absolute coordinate system and therefore, in the embodiments indicating the construction of the present invention, the surface shape of the ith surface is represented by the local coordinate system.

Also, the angle of tilt of the ith surface in the YZ plane is represented by an angle $\theta i$ (unit: °) in which a counter-clockwise direction relative to the Z-axis of the absolute coordinate system is positive. Consequently, in the embodiments of the present invention, the origin of the local coordinates of each surface is on the YZ plane in FIG. 1. There is no eccentricity of the surfaces in the XZ and XY planes. Further, the y- and z-axis of the local coordinates (x, y, z) of the ith surface are inclined by the angle $\theta i$ in YZ plane with respect to the absolute coordinate system (X, Y, Z), and specifically are set as follows:

z-axis: a straight line passing through the origin of the local coordinates and forming the angle $\theta i$ counter-clockwise in YZ plane with respect to the Z-direction of the absolute coordinate system y-axis: a straight line passing through the origin of the local coordinates and forming 90° counter-clockwise in YZ plane with respect to z-direction; and x-axis: a straight line passing through the origin of the local coordinates and perpendicular to the YZ plane Also, Di is the scaler amount representative of the spacing between the origins of the local coordinates of the ith surface and the (i+1)th surface, and Ndi and Vdi are the refractive index and the abbe number, respectively, of the medium between the ith surface and the (i+1)th surface.

Here, a spherical surface is a shape represented by the following expression:

$$Z = \frac{(x^2+y^2)/Ri}{1+\{1-(x^2+y^2)/Ri^2\}^{1/2}}$$

Also, the optical system of the present invention has at least one rotation-asymmetrical aspherical surface, and the shape thereof is represented by the following expression:

Assuming that $A=(a+b)\cdot(y^2\cos^2 t+x^2)$ $B=2a\cdot b\cdot\cos t[1+\{(b-a)\cdot y\cdot\sin t/(2a\cdot b)\}+[1+\{(b-a)\cdot y\cdot\sin t/(a\cdot b)\}-\{y^2/(a\cdot b)\}-\{$ $4a\cdot b\cdot\cos^2 t+(a+b)^2\sin^2 t\}x^2/(4a^2b^2\cos^2 t)]^{1/2}]$, $Z=A/B+C_{02}y^2+C_{20}x^2+C_{03}y^3+C_{21}x^2y+C_{04}y^4+C_{22}x^2y^2+C_{40}x^4$ The above curved surface expression has only the terms of even-number orders with respect to x and therefore, the curved surface prescribed by the above curved surface expression is of a plane-symmetrical shape having $y^2$ plane as a symmetrical plane. Further, when the following condition is satisfied, it represents a shape symmetrical with respect to xz plane.

$C_{03}=C_{21}=t=0$

Further, when $C_{02}=C_{20}C_{04}=C_{40}=C_{22}/2$ is satisfied, it represents a rotation-symmetrical shape. When the above-mentioned conditions are not satisfied, it represents a rotation-asymmetrical shape.

In describing the optical system included in the following embodiments, common terms and action will now be described. A diffraction grating surface having diffracting properties used in the following embodiments is literally a surface which adds the property of changing a phase level to a surface which provides a boundary and causes the deflection by diffraction.

The surface having such diffracting action can be classified roughly into a hologram type and a kinoform type as the classification by a manufacturing method. The surface of the hologram type is generally a surface having a hologram in which phase information is recorded as the interference fringe of two wave fronts called coherent object light and reference light, and there are an amplitude type, in which phase information is recorded as the difference in transmittance, and a phase type, in which phase information is recorded as a variation in refractive index. Recently, a CGH (computer hologram), in which the shape of an interference fringe is computed by a computer and the pattern thereof is depicted on a substrate, has also come to be made, and this is not made by causing two actual wave fronts to interfere with each other, but yet is conceptually the same and therefore, it is to be understood that it is included in the hologram type.

On the other hand, the kinoform type depicts the minute stripes of regular diffraction gratings in which the manner of passing light is changed on a boundary surface, and this also includes an amplitude type (zone plate) having a structure in which light passing portions and light intercepting portions are repeated, and a phase type (kinoform) in which a phase change of one period is a stripe as a change in the thickness of an angle structure on a boundary surface, and this structure is often repeated to thereby enhance the diffraction efficiency of a particular order.

Figure 19A:
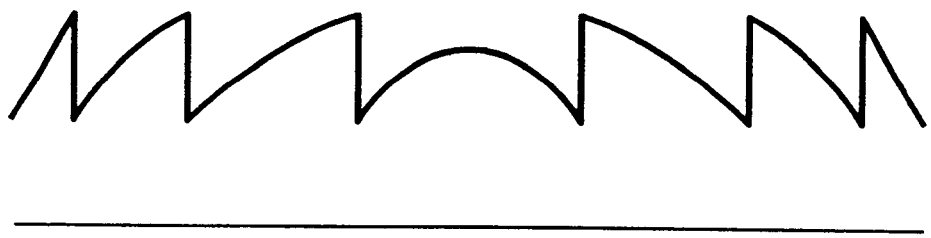
FIGS. 19A and 19B are conceptional views illustrating a kinoform optical system and a binary optical system.
Figure 19B:
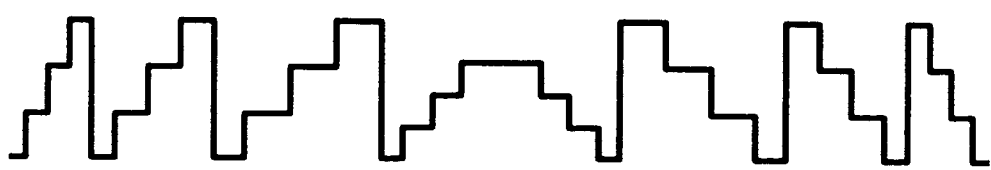

This phase type enables a mold, made by working (braze-working) each stripe by the use of a minute turning tool, to be made and the shape thereof to be transferred to an optical material, such as glass or plastic, by the use of the mold and therefore, identical kinoforms can be mass-produced inexpensively. Recently it has often been practiced not to express the angle structure of one period of this kinoform type as a continuous function (FIG. 19A), but to approximate it as a staircase-like shape of the power of 2 (n-th power of 2) steps as shown in FIG. 19B, and form the minute staircase structure by repeating the technique of photolithography N times.

The thus made kinoform is particularly called a kinoform of the binary type, or simply a diffraction element of the binary type. This diffraction element of the binary type, if a mold for working is made by the technique of photolithography like an ordinary kinoform, can transfer its shape to an optical material, such as glass or plastic, by the use of the mold and therefore, diffraction elements of the same binary type can be mass-produced inexpensively. The mold for the diffraction element of the binary type made by the technique of photolithography, as compared with the mold for the ordinary kinoform worked by the use of a turning tool, is easy to give it minute structure and therefore, the diffraction element of the binary type has become the mainstream of the diffraction element of the kinoform type.

Figure 1:
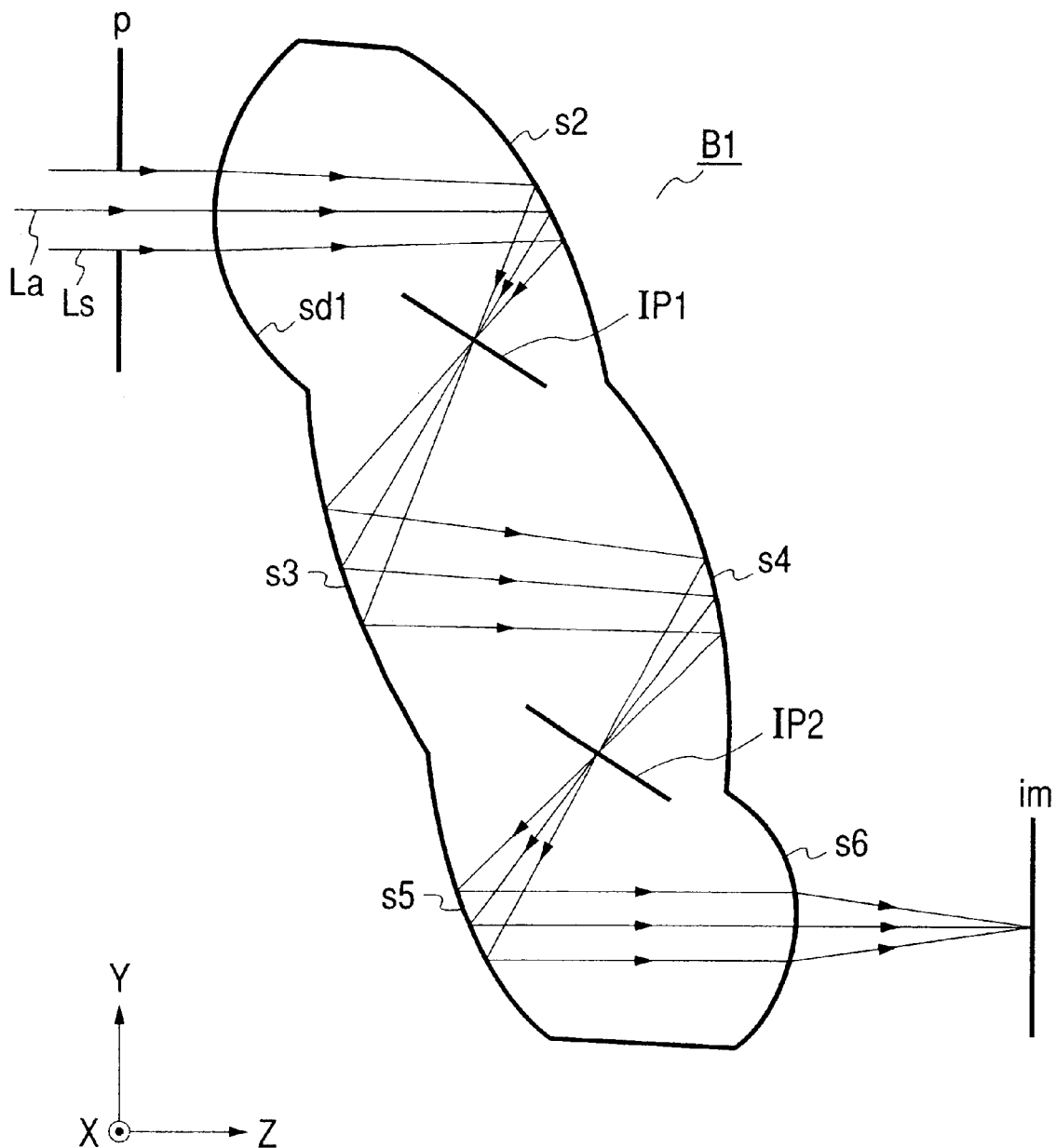
FIG. 1 is a schematic view of the essential portions of Embodiment 1 of the present invention.

Each embodiment of the present invention will now be described. FIG. 1 is a cross-sectional view of the essential portions of Embodiment 1 of the present invention and also shown an optical path. B1 designates an example of an optical element (off-axial optical element) in which a plurality of reflecting surfaces having a curvature are formed integrally with one another. The optical element B1 forms an incidence refracting surface sd1, the four reflecting surfaces of a concave mirror s2, a concave mirror s3, a concave mirror s4 and a concave mirror s5 and an emergence refracting surface s6 in succession along a reference axis ray of light La from an object side on the surface of a transparent member.

The reflecting surfaces s2 to s5 are off-axial curved surfaces. The refracting surfaces and the reflecting surfaces are all symmetrical with respect to the plane of the drawing sheet of FIG. 1 (YZ plane) and accordingly, the reference axes are all contained in YZ plane. The direction of the incidence reference axis and the direction of the emergence reference axis of the optical element B1 are parallel to each other and are in the same directions. Reflecting film is worked on each reflecting surface. Also, the optical element B1 has two sides parallel to the plane of the drawing sheet of FIG. 1.

im denotes the final image plane, and the image pickup surface of an image pickup element such as a CCD is positioned there. P designates an aperture disposed on the object side of the optical element B1, and La denotes the reference axis of an optical system.

The imaging action in the present embodiment will now be described. A light beam Ls from an object lying at infinity has its quantity of incident light limited by the aperture P, whereafter it enters the incidence refracting surface sd1 of the optical element B1 and is refracted thereby, and thereafter arrives at the concave mirror s2.

The concave mirror s2 reflects the object light beam Ls toward the concave mirror s3 and also, the object image is primarily formed on an intermediate imaging plane IP1 by the power of the concave mirror s2.

Thus, the object image is formed in the optical element B1 at an early stage, thereby suppressing an increase in the effective diameter of the ray of light on a surface disposed more adjacent to the image side than the aperture P.

The object light beam Ls primarily formed on the intermediate imaging plane IP1 is re-formed on an intermediate imaging plane IP2 by the concave mirror s3 and the concave mirror s4, whereafter it is sequentially reflected by the concave mirror s5, where it is refracted and emerges from the optical element B1.

The object light beam Ls is then imaged on the final image plane im. Thus, the optical element B1 repeats the reflection by the plurality of reflecting mirrors having a curvature, and yet functions as a lens unit having desired optical performance and having the imaging action as a whole and being very thin is X direction.

Also, in the present optical system, the optical element B1 is moved in a direction parallel to the incidence reference axis La thereof to thereby effect focusing.

Also, FIG. 1 shows an example of the optical system of the present invention. As the optical system of the present invention, besides this, there is, for example, a zooming optical system in which there are disposed a plurality of optical elements in which a plurality of reflecting surfaces having a curvature are formed integrally with one another and the plurality of optical elements are moved to thereby effect zooming.

The optical system of the present invention is incorporated and used in a video camera, a still video camera, a copying apparatus or the like.

In the present embodiment, the refracting surfaces sd1 and s6 may be formed by a lens system, the reflecting surfaces s2, s3, s4 and s5 may be formed by mirrors, and the optical element B1 may be constituted by a hollow element. This also holds true in all of the following embodiments.

In the optical element of the present embodiment, the reflecting surfaces s2, s3, s4 and s5 are off-axial curved surfaces (curved surfaces in which a reference axis formed by the optical path of a ray of light of a reference wavelength passing through the center of the aperture P and the center of the image plane im and the normal plane at a point of intersection do not coincide with each other).

In the off-axial optical element B1, due to the asymmetry of the incidence of the light beam onto the off-axial surface, the ray of light on the axis (reference axis) generally has asymmetrical aberrations, such as astigmatism and coma. To remove such asymmetrical aberrations, the off-axial curved surfaces usually use asymmetrical aspherical surfaces. However, when the number of the surfaces is small, such asymmetrical aberrations cannot often be removed by these off-axial curved surfaces alone. In that case, two refracting surfaces for incidence and emergence are also made into off-axial refracting surfaces to thereby mitigate the asymmetrical aberrations.

If in the present embodiment, the refracting surfaces are given the diffracting action of creating asymmetrical aberrations, the asymmetrical aberrations can be mitigated even if the surface shape of these refracting surfaces is not made asymmetrical (for example, by spherical surfaces which are not only easy to make but also can be used as surfaces providing the reference during the measurement of the surface shape) and the number of the surfaces need not be increased.

In the present embodiment, the surfaces given such diffracting action are given a symbol sd (pay attention sd1). This also holds true in the following.

The embodiment shown in FIG. 1 is one in which the refracting surface, which is the first surface, is given the diffracting action and therefore, the first surface is indicated as sd1. To give the refracting surface the diffracting action of creating asymmetrical aberrations, a method of attaching to the incidence surface a hologram, having rotation-asymmetrical stripes and a method of making a kinoform on the shape of the refracting surface are applicable.

As a method of making a kinoform on a refracting surface of a certain shape, there is a method of brazing by the use of a minute turning tool or a method of attaching grating stripes of the binary type as shown in FIG. 19B.

When it is desired to make such kinoform type a great deal and inexpensively, stripes may be made on a mold in advance by the use of the method of brazing by the use of a minute turning tool or the technique of lithography, and the shape thereof may be transferred when an optical element is to be formed of glass or plastic.

Figure 2:
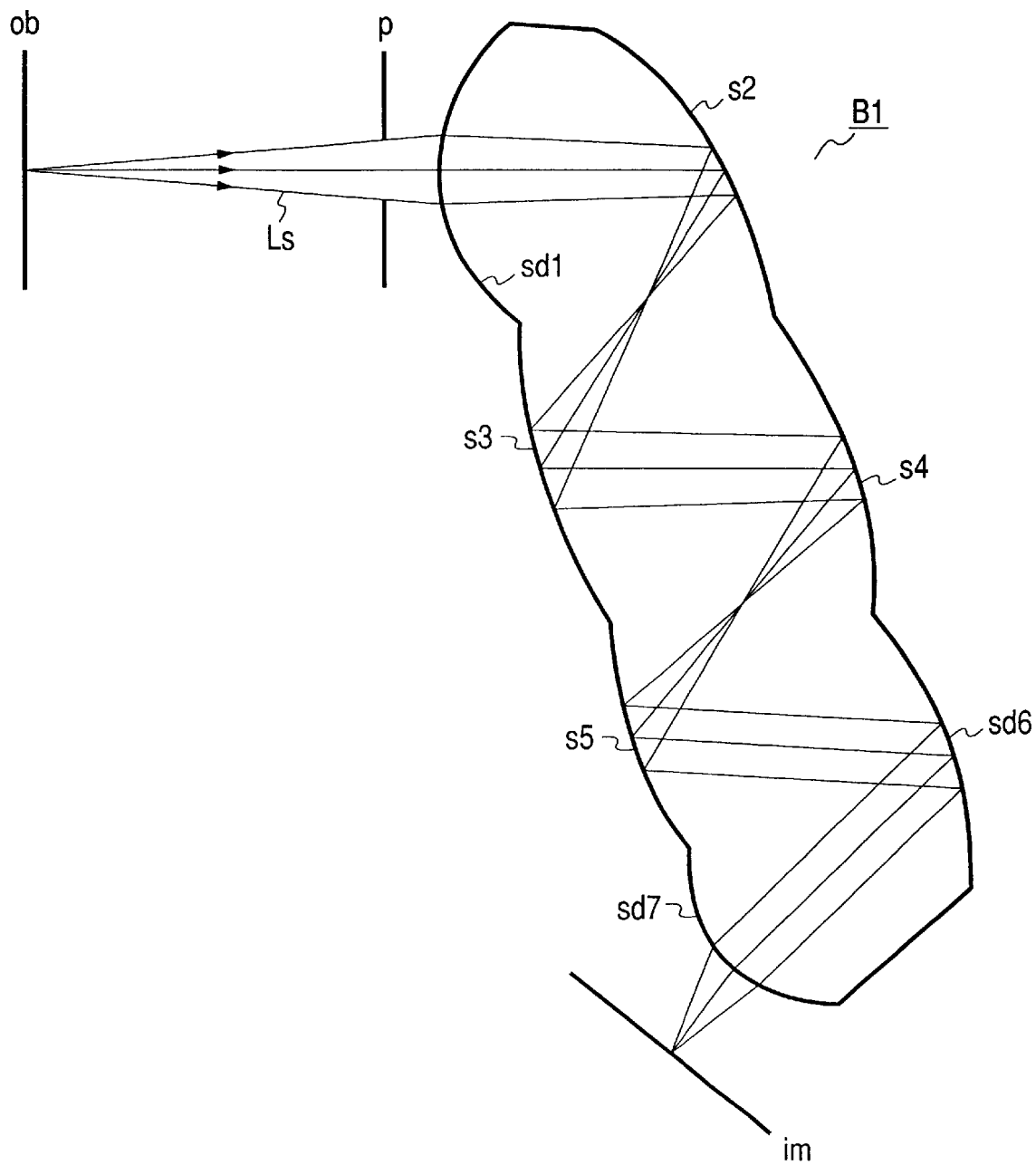
FIG. 2 is a schematic view of the essential portions of Embodiment 2 of the present invention.

FIG. 2 is a schematic view of the essential portions of Embodiment 2 of the present invention. In the present embodiment, a light beam Ls, from an object surface lying at a finite distance, passes through an aperture P, and thereafter enters an optical element B1, comprising two refracting surfaces and five reflecting surfaces being integrally molded. In this optical element B1, besides reflecting surfaces s2, s3, s4, s5 and s6, a refracting surface sd7 is an off-axial curved surface (a curved surface in which a reference axis formed by the optical path of a ray of light of a reference wavelength passing through the center of the aperture P and the center of the final image plane im and the plane normal at a point of intersection do not coincide with each other).

This optical element B1 is an off-axial optical element similar to Embodiment 1. Portions of asymmetrical aberrations created by these surfaces, which cannot be corrected by the shape of each surface, are corrected by giving rotation-asymmetrical diffracting action to the incidence refracting surface and the emergence refracting surface, and this is similar to Embodiment 1.

Again in this embodiment, the surfaces given such diffracting action are given a symbol sd and are indicated as sd1 and sd7. To give a refracting surface the diffracting action of creating asymmetrical aberrations, a method of attaching to the incidence surface a hologram having rotation-asymmetrical stripes or a method of making a kinoform on the shape of the refracting surface is applicable, and this is similar to Embodiment 1.

The technique of brazing as a method of making a kinoform on a refracting surface of a certain shape, the technique of making the binary type by the use of the lithography art, and a method of making a mold and transferring the shape thereof when it is to be made inexpensively and a great deal are also similar to those in Embodiment 1.

Figure 3:
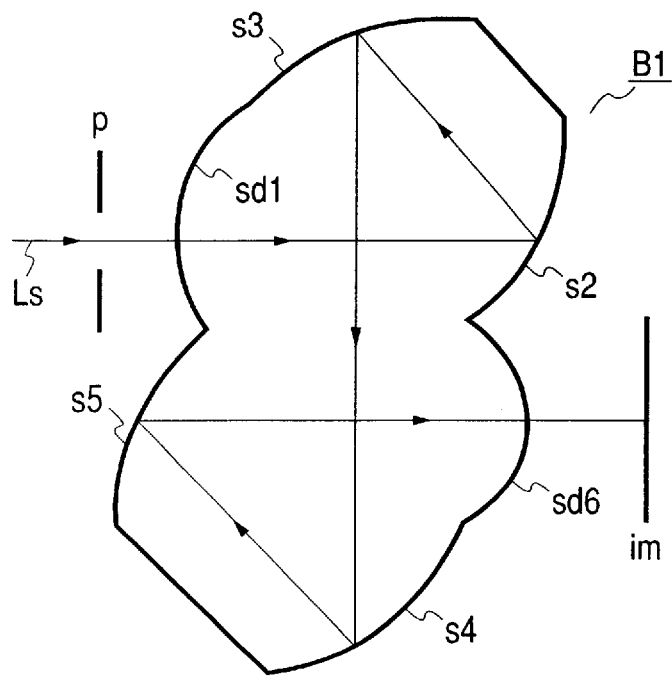
FIG. 3 is a schematic view of the essential portions of Embodiment 3 of the present invention.

FIG. 3 is a cross-sectional view of the essential portions of Embodiment 3 of the present invention. In this embodiment, as in Embodiment 1, a light beam Ls from an object surface lying at infinity passes through an aperture P, and thereafter enters an optical element B1 comprising two refracting surfaces and four reflecting surfaces being integrally molded. In this optical element B1, reflecting surfaces s2, s3, s4 and s5 are off-axial curved surfaces (curved surfaces in which a reference axis formed by the optical path of a ray of light of a reference wavelength passing through the center of the aperture P and the center of the image plane im and the normal plane at a point of intersection do not coincide with each other).

This optical element is an off-axial optical element similar to Embodiment 1. This optical element differs from Embodiment 1 in that the optical path of the reference axis is of an intersecting type. The off-axial optical element of such an intersecting type has the feature that the optical path can be made compact. As in Embodiment 1, portions of asymmetrical aberrations created by these off-axial curved surfaces that cannot be corrected by the shape of each surface are corrected by giving the rotation-asymmetrical diffracting action to the incidence refracting surface and the emergence refracting surface.

Again in the figure of this embodiment, the surfaces given such diffracting action are given a symbol sd and are indicated as sd1 and sd6. To give a refracting surface the diffracting action of creating asymmetrical aberrations, a method of attaching to the incidence surface a hologram having rotation-asymmetrical stripes or a method of making a kinoform on a refracting surface of a certain shape is applicable, and this is similar to Embodiment 1. The technique of brazing as a method of making a kinoform on the shape of a refracting surface, the technique of making the binary type by the use of lithography art, and a method of making a mold and transferring the shape thereof when it is to be made inexpensively and a great deal are also similar to those in Embodiment 1.

Figure 4:
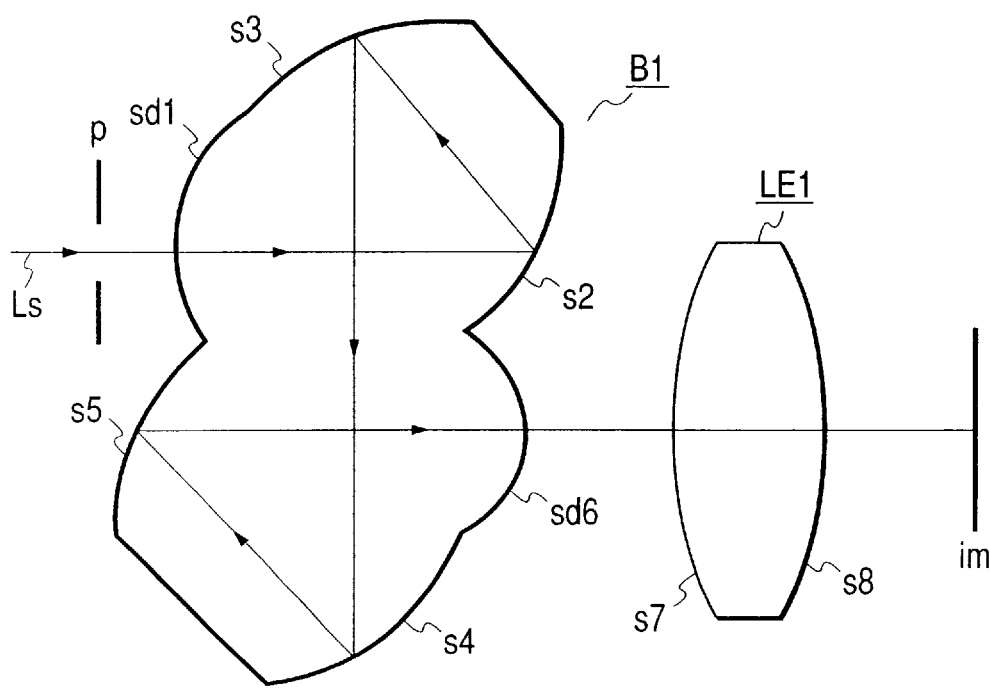
FIG. 4 is a schematic view of the essential portions of Embodiment 4 of the present invention.

FIG. 4 is a cross-sectional view of the essential portions of Embodiment 4 of the present invention. The optical system of this embodiment is a hybrid optical system comprising an off-axial optical element (first optical element) B1 and an ordinary coaxial optical element (second optical element) LE1. In this optical system, as in Embodiment 3, a light beam Ls from an object surface lying at infinity passes through an aperture P, and thereafter enters the first optical element B1 comprising two refracting surfaces and four reflecting surfaces being integrally molded. In this first optical element B1, reflecting surfaces s2, s3, s4 and s5 are off-axial curved surfaces (surfaces in which a reference axis formed by the optical path of a ray of light of a reference wavelength passing through the center of the aperture P and the center of the image surface im and the normal plane at a point of intersection do not coincide with each other) and therefore, this optical element B1 is an off-axial optical element similar to Embodiment 3.

As in Embodiment 3, portions of asymmetrical aberrations created by these off-axial curved surfaces which cannot be corrected by the shape of each surface are corrected by giving rotation-asymmetrical diffracting action to the incidence refracting surface and the emergence refracting surface. In this optical system, however, rotation-symmetrical aberrations need not always be removed by the first optical element B1. In this Embodiment 4, the rotation-symmetrical aberrations are removed by the entire system comprising the coaxial optical element LE1 comprising surfaces s7 and s8, besides the first optical element B1. Again in the figure of this Embodiment, surfaces given the diffracting action are given a symbol sd and are indicated as sd1 and sd6.

To give a refracting surface the diffracting action of creating asymmetrical aberrations, a method of attaching to the incidence surface a hologram having rotation-asymmetrical stripes or a method of making a kinoform on a refracting surface of a certain shape is applicable, and this is similar to Embodiment 1. The technique of brazing as a method of making a kinoform on the shape of a refracting surface, the technique of making the binary type by the use of lithography art, and a method of making a mold and transferring the shape thereof when it is to be made inexpensively and a great deal are also similar to those in Embodiment 1.

Figure 5:
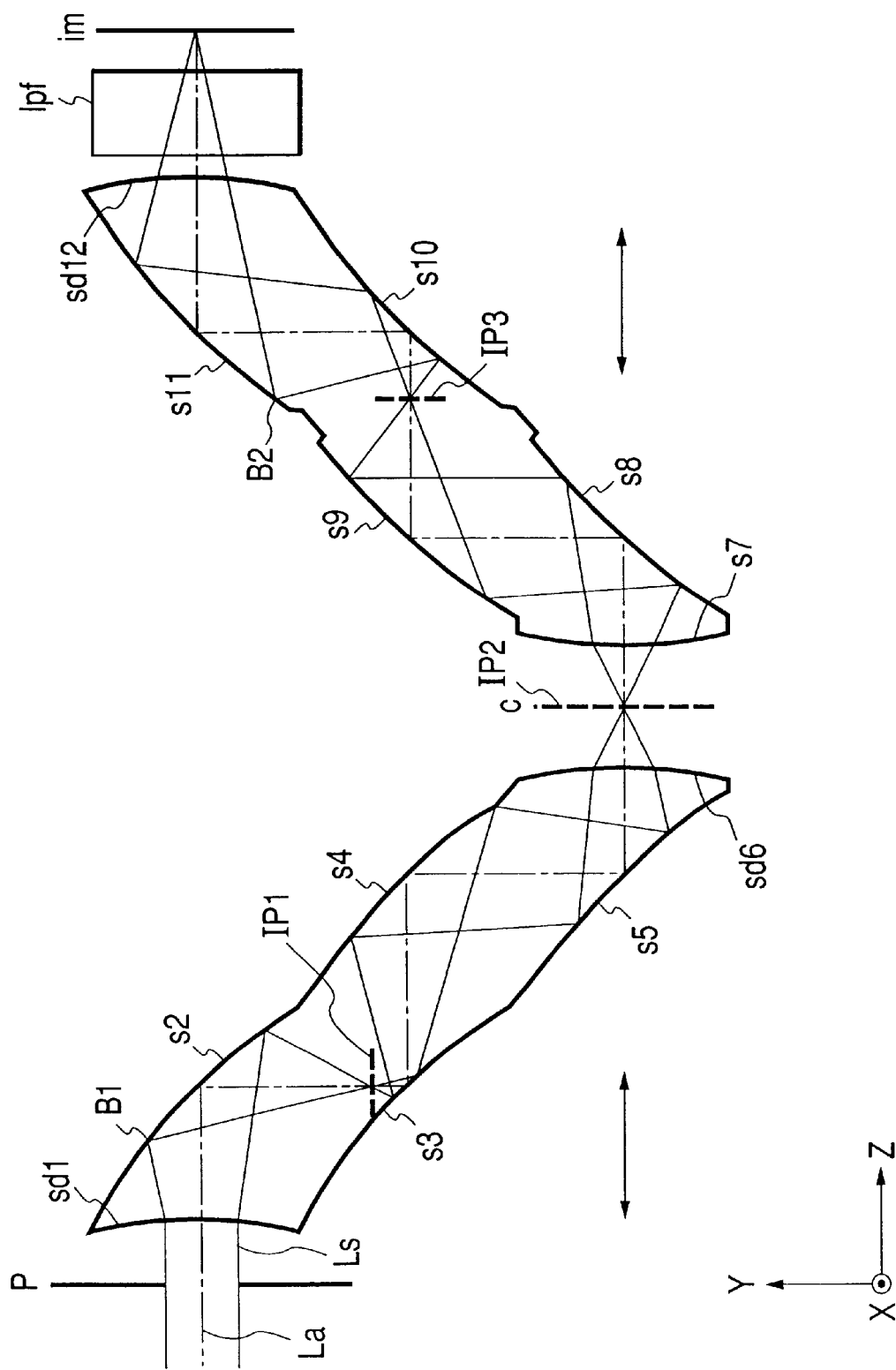
FIG. 5 is a schematic view of the essential portions of Embodiment 5 of the present invention.

FIG. 5 is a cross-sectional view of the essential portions of Embodiment 5 of the optical system of the present invention, and FIGS. 6A and 6B are illustrations of the paraxial refractive power disposition of FIG. 5.

This embodiment shows a zoom lens of the so-called two-unit type using two off-axial optical elements B1 and B2. It also shows a case where a surface giving diffracting action to a refracting surface is disposed in a movable unit in the zoom lens.

In FIG. 5, B1 and B2 designate first and second optical elements having a plurality of curved reflecting surfaces. The first optical element B1 is a lens unit comprising, in succession from the object side, a concave refracting surface sd1, four off-axial reflecting surfaces, i.e., a concave mirror s2, a convex mirror s3, a concave mirror s4 and a convex mirror s5, and a convex refracting surface sd6, and having positive refractive power as a whole. The direction of a reference axis entering the first optical element B1 and the direction of a reference axis emerging therefrom are parallel to each other and the same.

In this first optical element B1, the refracting surface sd1 and the refracting surface sd6 are given the diffracting action and are given the action of correcting a rotation-symmetrical aberration component and a rotation-asymmetrical aberration component created by this optical element B1.

The second optical element B2 is a lens unit comprising, in succession from the object side, a convex refracting surface s7, four off-axial reflecting surfaces, i.e., a convex mirror s8, a concave mirror sb9, a convex mirror s10 and a concave mirror s11, and a convex refracting surface sd12, and having positive refractive power as a whole. As in the first optical element B1, the direction of a reference axis entering the second optical element B2 and the direction of a reference axis emerging therefrom are parallel to each other and the same. In this second optical element B2, the refracting surface sd12 is given the diffracting action and is given the action of correcting a rotation-symmetrical aberration component and a rotation-asymmetrical aberration component created by this optical element B2.

1pf designates an optical correcting plate comprising a plane parallel plate, or a rock crystal low-pass filter, an infrared cut filter or the like. Also, im denotes an image pickup element surface such as the image pickup surface of a CCD (image pickup medium) or the like. P designates an aperture disposed on the object side of the first optical element B1.

The imaging action of the present embodiment will now be described. A light beam Ls from an object has its quantity of incident light regulated by the aperture p, is refracted and diffracted by and transmitted through the concave refracting surface sd1 of the first optical element B1, repeats reflection on the concave mirror s2, the convex mirror s3, the concave mirror s4 and the convex mirror s5, is subjected to converging or diverging action by the power of each reflecting mirror, arrives at the convex refracting surface sd6, is refracted and diffracted there and emerges from the first optical element B1. In the first optical element B1, the intermediate image of the object is once formed on an intermediate imaging plane (primary imaging plane) IP1.

It is effective for suppressing an increase in the effective diameter of a ray of light on a surface disposed more adjacent to the image side than to the aperture p that the object image is thus once formed in the first optical element B1. The light beam primarily imaged on the primary imaging plane IP1 repeats reflection on the convex mirror s3, the concave mirror s4 and the convex mirror s5, is subjected to the converging or diverging action by the power of each reflecting mirror, and arrives at the convex refracting surface sd6, and the light beam refracted and diffracted there forms an object image on a secondary imaging plane C (IP2).

Thus, the first optical element B1 functions as a lens unit which repeats the refraction by the incidence and emergence surfaces and the reflection by a plurality of curved reflecting mirrors and which is provided with desired optical performance and has positive power as a whole.

The light beam is then transmitted through the convex refracting surface s7 of the second optical element B2, whereafter it repeats reflection on the convex mirror s8, the concave mirror s9, the convex mirror s10 and the concave mirror s11, is refracted and diffracted by the convex refracting surface sd12 and emerges from the second optical element B2. Again in the second optical element B2, the intermediate image of the object is once formed on an intermediate imaging plane IP3.

The light beam which has emerged from the second optical element B2 passes through the optical correcting plate 1pf, and thereafter is imaged on the image pickup element surface im. Thus, the second optical element B2 re-forms the object image formed on the secondary imaging plane C (IP2) by the first optical element B1 on the image pickup element surface im, and like the first optical element B1, it functions as a lens unit which repeats the refraction and diffraction by the incidence and emergence surfaces and the reflection by the plurality of curved reflecting mirrors and which is provided with desired optical performance and has positive power as a whole.

In the present embodiment, the first optical element B1 and the second optical element B2 are discretely moved relative to the imaging plane im, thereby changing the focal length (imaging magnification) of the optical system (this is an operation called focal length change or zooming) without changing the final imaging position im.

The focal-length changing action of the present embodiment will now be described with reference to FIGS. 6A and 6B. FIGS. 6A and 6B show optical arrangements in which each of the optical elements B1 and B2 of Embodiment 5 is a single thin lens and the optical system is developed relative to the reference axis thereof. FIG. 6A is an arrangement view showing a state in which the optical system is at the wide angle end (W), and FIG. 6B is an arrangement view showing a state in which the optical system is at the telephoto end (T).

In FIGS. 6A and 6B, the focal length of the first optical element B1 is defined as f1, and the focal length of the second optical element B2 is defined as f2. When the optical system is in the state of the wide angle end, when the distance from the front side focus F2 of the second optical element B2 to the image point of the first optical element B1 is defined as xW (having a negative value) and the distance from the rear side focus F2' to the imaging plane im is defined as xW', if Newton's imaging formula $$xW * xW' = -f2 * f2$$

is established, the imaging magnification $\beta 2W$ of the second optical element B2 is $$\beta 2W = -(xW' + f2)/(-xW + f2)$$
$$= f2/xW$$
$$= -xW'/f2$$

and the focal length fW of the wide angle end is $$fW = f1 * \beta 2W$$
$$= f1 * f2/xW.$$

Here, the second optical element B2 is moved while satisfying Newton's imaging formula and the first optical element B1 is moved so as to correct the change in the position of the object point of the second optical element B2 resulting from the movement of the second optical element B2, whereby the optical system changes the focal length of the whole without changing the final imaging position im.

Let it be assumed that the second optical element B2 has been moved by a predetermined amount and focal length change has been effected from the wide angle end (W) to the telephoto end (T). When during this state of the telephoto end, the distance from the front side focus F2 of the second optical element B2 to the image point of the first optical element B1 is defined as xT(−) and the distance from the rear side focus F2' to the imaging plane im is defined as xT', the imaging magnification β2T of the second optical element B2 is $$\beta 2T = (xT' + f2)/(-xT + f2)$$
$$= f2/xT$$
$$= -xT'/f2$$

and the focal length fT of the telephoto end is $$fT = f1 * \beta 2T$$
$$= f1 * f2/xT$$

and therefore, the variable power ratio Z of the optical system is $$Z = fT/fW$$
$$= xW/xT.$$

In the present embodiment, the secondary imaging plane C (IP2) as the intermediate imaging plane is present intermediately of the first optical element B1 and the second optical element B2, but the intermediate imaging plane may be present in the interior of the first optical element B1 or the second optical element B2. The imaging relation of the second optical element B2 holds good with this intermediate imaging position as the object point.

Also, when unlike the construction of the present embodiment, there are, in succession from the object side, an optical element having a negative refractive power as a whole and an optical element having a positive refractive power, or when there are, in succession from the object side, an optical element having a positive refractive power as a whole and an optical element having a negative refractive power, the optical elements can be moved relative to each other to thereby change the focal length (imaging magnification) of the photo-taking optical system.

Also, as regards the direction of movement of the optical elements during a focal length change, if the incidence point position of the reference axis of each reflecting surface is not changed during the movement from the wide angle end to the telephoto end, the error occurring during the focal length change can be minimized and therefore, the directions of the reference axes entering and emerging from the optical elements B1 and B2 can be made parallel to each other and the optical elements can be moved in parallel along the reference axis lines entering and emerging from the optical elements.

In this case, when constructing an optical element in which the directions of the reference axes entering and emerging from each optical element are parallel to each other, there are conceivable two kinds of patterns, i.e., making the direction of emergence the same as the direction incidence as shown in the present embodiment, or making the direction of emergence opposite to the direction of incidence as shown in the next embodiment.

When the direction is made the same as the direction of incidence, it becomes possible to shift the positions of the incident reference axis and the emerging reference axis to desired positions. Also, when the direction of emergence is made opposite to the direction of incidence, the spacing between the incidence side and the emergence side changes by the same amount as the amount of movement with the movement of the optical element and therefore, it becomes possible to change the length of the optical path by double of the amount of movement as a whole.

Thus, the zoom optical system using the off-axial optical system can be constructed by the above-described two kinds of patterns and therefore, the degree of freedom of the optical arrangement can be increased.

However, the direction of movement of the optical element need not be parallel to the directions of the reference axes entering and emerging from the two optical elements, but for example, the direction of the reference axis entering the optical system and the direction of movement of the movable optical element may form a certain angle such as 30°, 45° or 60° therebetween.

FIG. 7 is a schematic view of the essential portions of Embodiment 6 of the present invention. This embodiment shows a so-called two-unit type zoom lens. This embodiment shows a case where the direction of movement of an optical element B2 moved during a focal length change is not parallel to the direction of the incidence reference axis L1a of an optical element B1 disposed most adjacent to the object side. It also shows a case where a refracting surface given diffracting action is disposed in a fixed lens unit in the zoom lens.

In FIG. 7, B1 and B2 designate first and second optical elements, respectively, having a plurality of curved reflecting surfaces. The first optical element B1 is a lens unit comprising, in succession from the object side, a concave refracting surface sd1, four reflecting surfaces, i.e., a concave mirror s2, a convex mirror s3, a concave mirror s4 and a concave mirror s5, and a convex refracting surface sd6, and having a positive refractive power as a whole, and becomes a fixed lens unit during zooming. The direction of a reference axis L1a entering the first optical element B1 and the direction of a reference axis La2 emerging therefrom have an inclination of about 45°. The refracting surfaces sd1 and sd6 are given a diffracting action, and the design of the device is made such that the correction of symmetrical aberrations and asymmetrical aberrations is effected by the use of the degree of freedom of the diffracting action and the number of constituent surfaces becomes as small as possible.

The second optical element B2 is a lens unit comprising, in succession from the object side, a concave refracting surface sd7, six reflecting surfaces, i.e., a concave mirror s8, a concave mirror s9, a convex mirror s10, a concave mirror s11, a concave mirror s12 and a concave mirror s13, and a convex refracting surface sd14, and having a positive refractive power as a whole. The direction of a reference axis La2 entering the second optical element B2 and the direction of a reference axis La3 emerging therefrom are parallel and opposite to each other. 1pf designates an optical correcting plate comprising a plane parallel plate, or a rock crystal low-pass filter, an infrared cut filter, or the like.

im denotes an image pickup element surface or the image pickup surface of a CCD (image pickup medium) or the like. p designates an aperture disposed on the object side of the first optical element B1.

The imaging action of the present embodiment will now be described. A light beam Ls from the object has its quantity of incident light regulated by the aperture p, whereafter it is refracted and diffracted by and transmitted through the concave refracting surface sd1 of the first optical element B1, repeats reflection on the concave mirror s2, the convex mirror s3, the concave mirror s4 and the concave mirror s5, is subjected to the converging or diverging action by the power of each reflecting mirror, and arrives at the convex refracting surface sd6, and the light beam refracted and diffracted there forms an object image on an intermediate imaging plane IP1. The intermediate image of the object is also once formed in the first optical element B1.

The light beam from the object image on the intermediate imaging plane IP1 is transmitted through the concave refracting-diffracting surface sd7 of the second optical element B2, whereafter it is refracted and diffracted by the convex refracting-diffracting surface sd8 via the concave mirror s8, the concave mirror s9, the convex mirror s10, the concave mirror s11, the concave mirror s12 and the concave mirror s13, and emerges from the second optical element B2. The intermediate image of the object is also once formed in the second optical element B2.

The light beam that has emerged from the second optical element B2, passes through the optical correcting plate 1pf, and thereafter is imaged on the image pickup element surface im.

In the present embodiment, focusing to different object distances is effected by moving the second optical element B2. At this time, the second optical element B2 is moved parallel to the direction of the reference axis La2 emerging from the first optical element B1, but the direction of the reference axis La1 entering the first optical element B1 and the direction of the reference axis emerging therefrom form an inclination of about 45° and thus, the direction in which the second optical element B2 is moved during focusing is inclined by about 45° with respect to the direction of the reference axis entering the first optical element B1.

Accordingly, the second optical element B2 is moved parallel to the directions of the reference axes La2 and La3 entering and emerging from the second optical element during focusing, but it is moved with an inclination of 45° with respect to the direction of the reference axis La1 entering the first optical element B1.

Again in the present embodiment, as in Embodiment 5, the first and second optical elements B1 and B2 are moved relative to the imaging plane in the thereby change the imaging magnification of the optical system. However, unlike Embodiment 5 in which the directions of the reference axes entering and emerging from each optical element and the direction of movement of each optical element are all parallel to one another, the direction of the reference axis entering the first optical element B1 and the direction of the reference axis emerging therefrom form an inclination of 45° and therefore, in order to maintain the direction of the reference axis entering the second optical element B2 from the first optical element B1 during the focal length changing operation, the first optical element B1 is moved in parallel to the direction of the incident reference axis of the second optical element B2.

Figure 8:
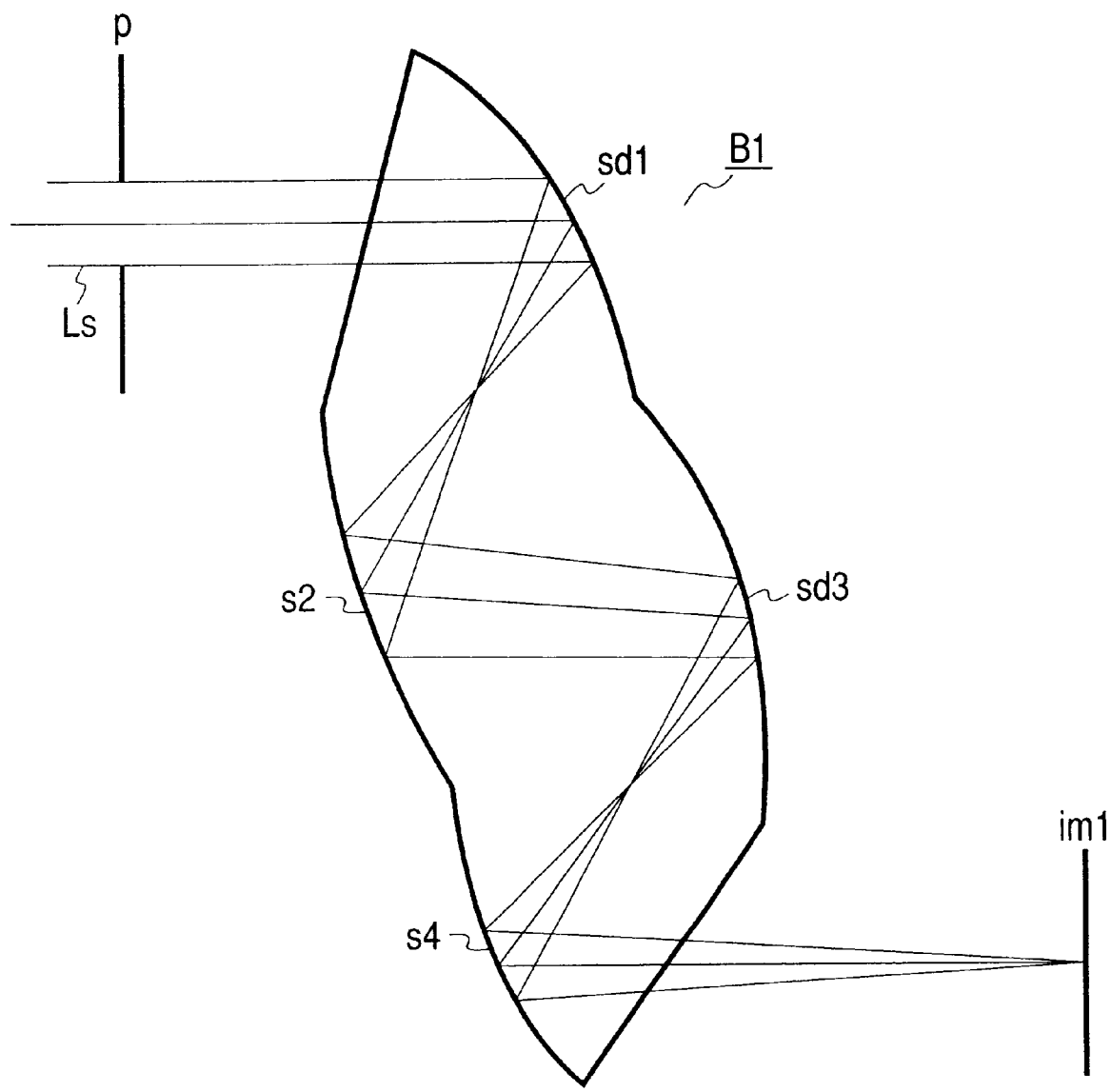
FIG. 8 is a schematic view of the essential portions of Embodiment 7 of the present invention.

FIG. 8 is a schematic view of the essential portions of Embodiment 7 of the present invention. In the optical system of the present embodiment, a light beam Ls from an object surface at infinity passes through an aperture P, whereafter it enters an optical element B1 whose incidence and emergence surfaces are flat surfaces and which comprises four reflecting surfaces being integrally molded. In this optical element B1, reflecting surfaces sd1, s2, sd3 and s4 are off-axial curved surfaces (curved surfaces in which a reference axis formed by the optical path of a ray of light of a reference wavelength passing through the center of the aperture P and the center of the image plane im and the normal plane at a point of intersection do not coincide with each other) and therefore, this optical element B1 is an off-axial optical element.

In such an off-axial optical element, due to the asymmetry of the incidence of a light beam onto the off-axial curved surfaces, generally the ray of light on the axis (the reference axis) also has asymmetrical aberrations, such as astigmatism and coma. In order to remove such asymmetrical aberrations, asymmetrical aspherical surfaces are usually used as the off-axial curved surfaces. However, when the number of surfaces is small, the asymmetrical aberrations cannot often be completely removed by these off-axial curved surfaces alone. So, these reflecting surfaces are given the diffracting action of creating asymmetrical aberrations, whereby even if the surface shape of these reflecting surfaces is not made asymmetrical (for example, is made into a spherical surface which is not only easy to make, but also can be used as a surface providing a reference during the measurement of the surface shape), the asymmetrical aberrations can be mitigated and the number of surfaces need not be increased.

In the figure of the present embodiment, the surfaces given such diffracting action are given a symbol sd as in the previous case where the refracting surfaces are given the diffracting action, and are indicated. FIG. 8 shows an embodiment in which the first and third reflecting surfaces are given the diffracting action and therefore, the first surface is indicated as sd1 and the third surface is indicated as sd3. To give the reflecting surfaces the diffracting action of creating asymmetrical aberrations, a method of attaching to these reflecting surfaces a hologram having rotation-asymmetrical stripes, or a method of making a kinoform on the shape of the reflecting surfaces is applicable.

As a method of making a kinoform on a reflecting surface of a certain shape, there is a method of brazing by the use of a minute turning tool, or a method of attaching the grid stripes of the binary type as shown in FIG. 19B by the technique of lithography. When it is desired to make such a kinoform type a great deal and inexpensively, it may be made by the method of brazing by the use of a minute turning tool, or by making stripes in advance on a mold by the use of the technique of lithography, and transferring the shape thereof when an optical element is to be formed of glass or plastic.

Figure 9:
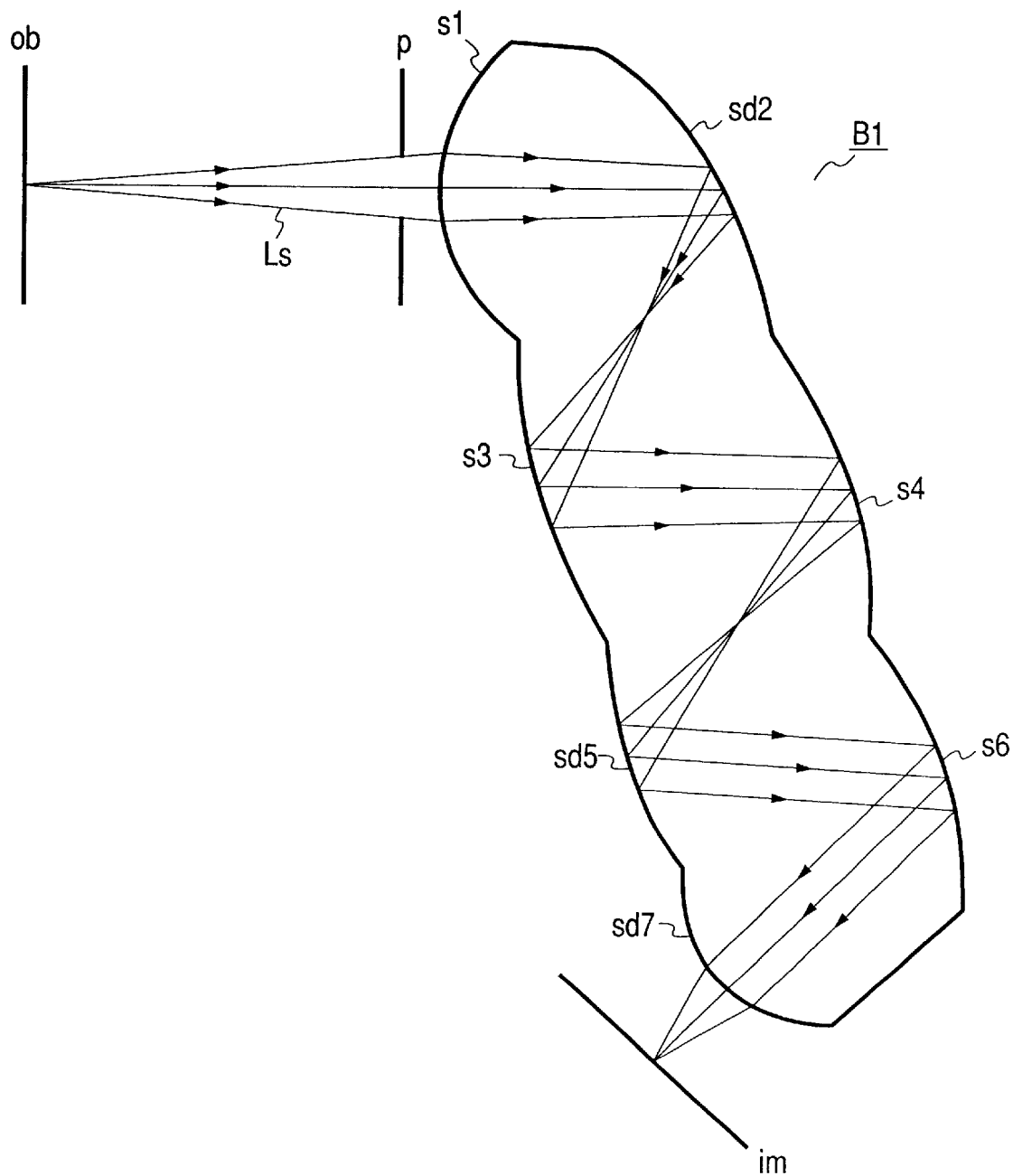
FIG. 9 is a schematic view of the essential portions of Embodiment 8 of the present invention.

FIG. 9 is a schematic view of the essential portions of Embodiment 8 of the present invention. In the optical system of the present embodiment, a light beam Ls from an object surface lying at a finite distance passes through an aperture P, whereafter it enters an optical element B1 comprising two refracting surfaces and five reflecting surfaces being integrally molded. In this optical element B1, besides reflecting surfaces sd2, s3, s4, sd5 and s6, a refracting surface sd7 is an off-axial curved surface (a curved surface in which a reference axis formed by the optical path of a ray of light of a reference wavelength passing through the center of the aperture P and the center im of the image plane and the normal plane at a point of intersection do not coincide with each other) and therefore, this optical element is an off-axial optical element similar to Embodiment 7.

As in embodiment 7, portions of asymmetrical aberrations created by these surfaces that cannot be corrected by the shape of each surface are corrected by giving several reflecting surfaces rotation-asymmetrical diffracting action. Also, the surfaces given the diffracting action need not be reflecting surfaces only and therefore, as in the case of Embodiment 2, the emergence refracting surface is also given the diffracting action. Again in the figure of this embodiment, the surfaces given such diffracting action are given a symbol sd and are indicated as sd2, sd5 and sd7.

To give the reflecting surfaces and the refracting surfaces the diffracting action of creating asymmetrical aberrations, a method of attaching to the reflecting surfaces and the refracting surfaces to be given the diffracting action a hologram having rotation-asymmetrical stripes or a method making a kinoform on the shape of those surfaces is applicable, and this is similar to Embodiment 7.

The technique of brazing as a method of making a kinoform on a reflecting surface or a refracting surface of a certain shape, the technique of making the binary type by the use of lithography art, and a method of making a mold and transferring the shape thereof when it is to be made inexpensively and in a great deal are also similar to those in Embodiment 7.

Figure 10:
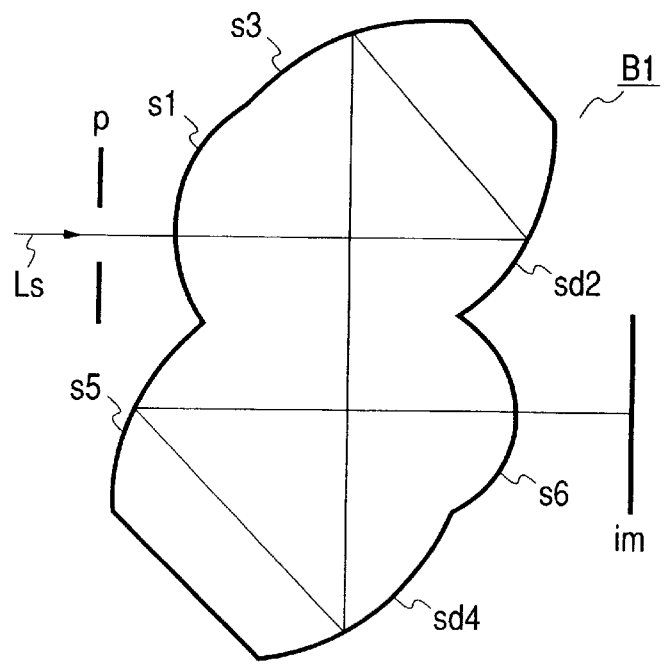
FIG. 10 is a schematic view of the essential portions of Embodiment 9 of the present invention.

FIG. 10 is a schematic view of the essential portions of Embodiment 9 of the present invention. In the optical system of the present embodiment, as in Embodiment 7, a light beam Ls from an object surface lying at infinity passes through an aperture P, whereafter it enters an optical element B1 comprising two refracting surfaces and four reflecting surfaces being integrally molded. In this optical element B1, reflecting surfaces sd2, s3, sd4 and s5 are off-axial curved surfaces (curved surfaces in which a reference axis formed by the optical path of a ray of light of a reference wavelength passing through the center of the aperture and the center of the image plane im and the plane normal at a point of intersection do not coincide with each other) and therefore, this optical element B1 is an off-axial optical element similar to Embodiment 7.

The present embodiment differs from Embodiment 7 in that the optical path of the reference axis is of the intersection type. An off-axial element of such an intersection type has the feature that the optical path thereof can be made compact. As in Embodiment 7, portions of asymmetrical aberrations created by these off-axial curved surfaces that cannot be corrected by the shape of each surface are corrected by giving the reflecting surfaces sd2 and sd4 rotation-asymmetrical diffracting action. Again in the figure of this embodiment, the surfaces given such diffracting action are given a symbol sd and are indicated as sd2 and sd4.

To give the reflecting surfaces the diffracting action of creating asymmetrical aberrations, a method of attaching to those surfaces a hologram having rotation-asymmetrical stripes, or a method of making a kinoform on a reflecting surface of a certain shape is applicable, and this is similar to Embodiment 7. The technique of brazing as a method of making a kinoform on the shape of a surface, the technique of making the binary type by the use of lithography art, and a method of making a mold and transferring the shape thereof when it is to be made inexpensively and a great deal are also similar to those in Embodiment 7.

Figure 11:
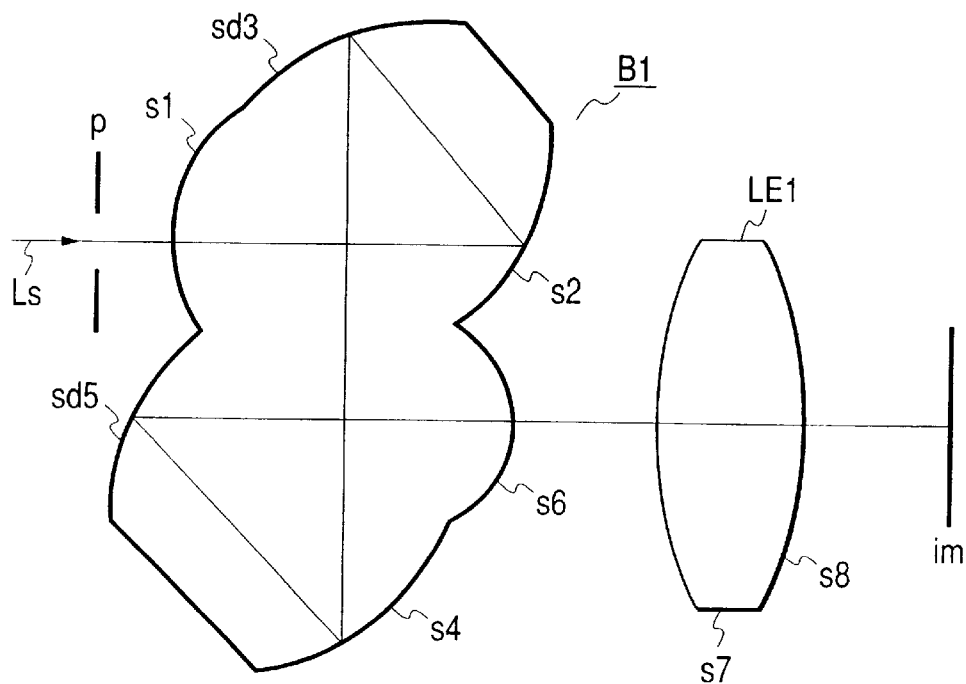
FIG. 11 is a schematic view of the essential portions of Embodiment 10 of the present invention.

FIG. 11 is a schematic view of the essential portions of Embodiment 10 of the present invention. The optical system of the present embodiment is a hybrid optical system comprising an off-axial optical element B1 and an ordinary coaxial optical element LE1. In this optical system, as in Embodiment 9, a light beam Ls from an object surface lying at infinity passes through an aperture P, whereafter it enters a first optical element B1 comprising two refracting surfaces and four reflecting surfaces being integrally molded.

In this first optical element B1, reflecting surfaces s2, sd3, s4 and sd5 are off-axial curved surfaces (curved surfaces in which a reference axis formed by the optical path of a ray of light of a reference wavelength passing through the center of the aperture P and the center of the image plane in and the plane normal at a point of intersection do not coincide with each other) and therefore, this optical element is an off-axial optical element similar to Embodiment 9.

As in Embodiment 9, portions of asymmetrical aberrations created by these off-axial curved surfaces that cannot be corrected by the shape of each surface are corrected by giving the third and fifth reflecting surfaces the rotation-asymmetrical diffracting action. However, in this optical system, rotation-symmetrical aberrations need not always be removed by this first optical element B1. In this embodiment, rotation-symmetrical aberrations are removed by the entire system comprising the first optical element B1 and a second coaxial optical element Le1 comprising surfaces s7 and s8.

Again in the figure of this embodiment, the surfaces given the diffracting action are given a symbol sd and are indicated as sd3 and sd5. To give the reflecting surfaces the diffracting action of creating asymmetrical aberrations, a method of attaching to those surfaces a hologram having rotation-asymmetrical stripes, or a method of making a kinoform on a surface of a certain shape is applicable, and this is similar to Embodiment 7.

The technique of brazing as a method of making a kinoform on a surface of a certain shape, the technique of making the binary type by the use of lithography art, and a method of making a mold and transferring the shape thereof when it is to be made inexpensively and a great deal are also similar to those in Embodiment 7.

Figure 12:
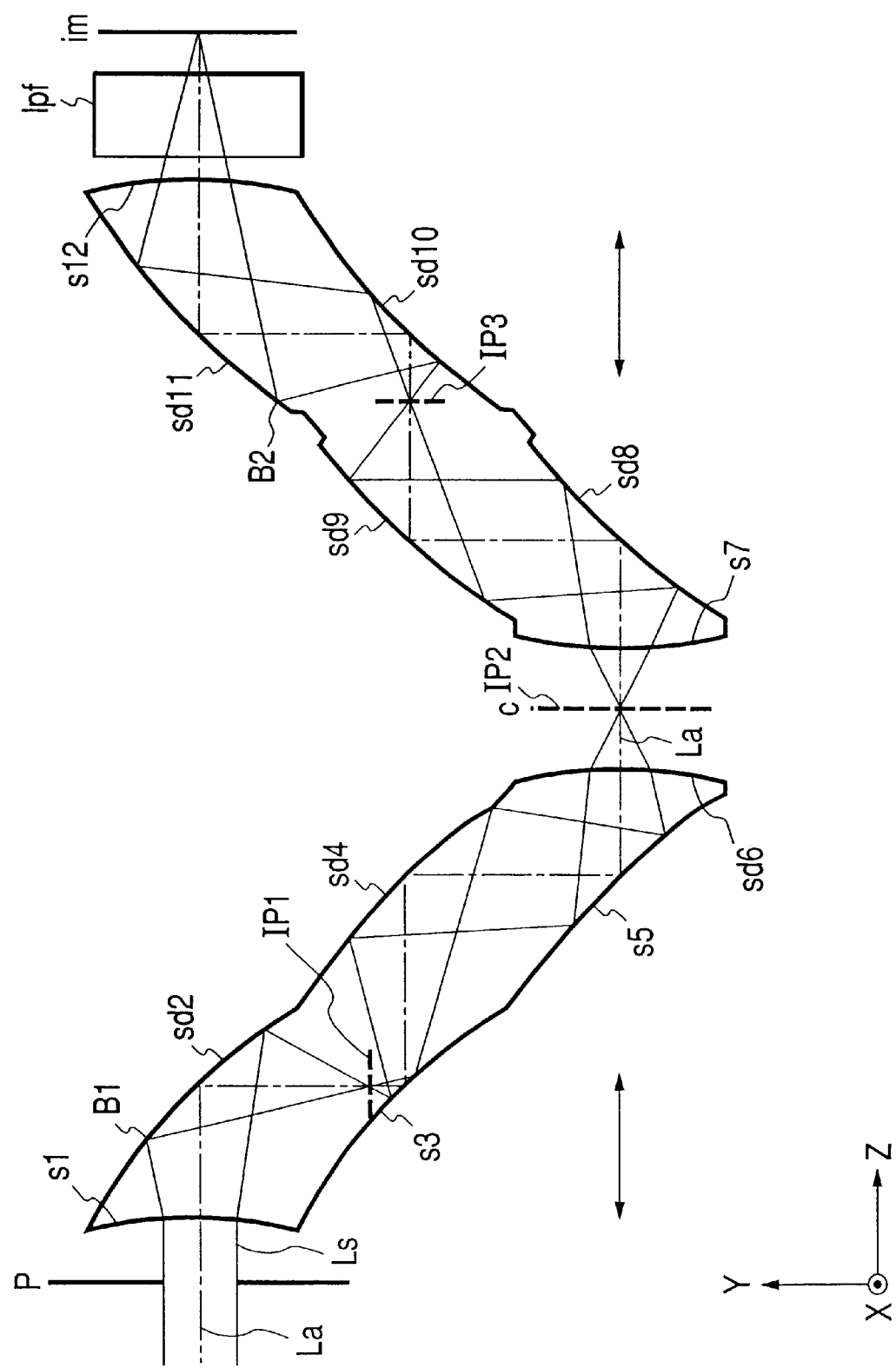
FIG. 12 is a schematic view of the essential portions of Embodiment 11 of the present invention.
Figures 13A, 13B:
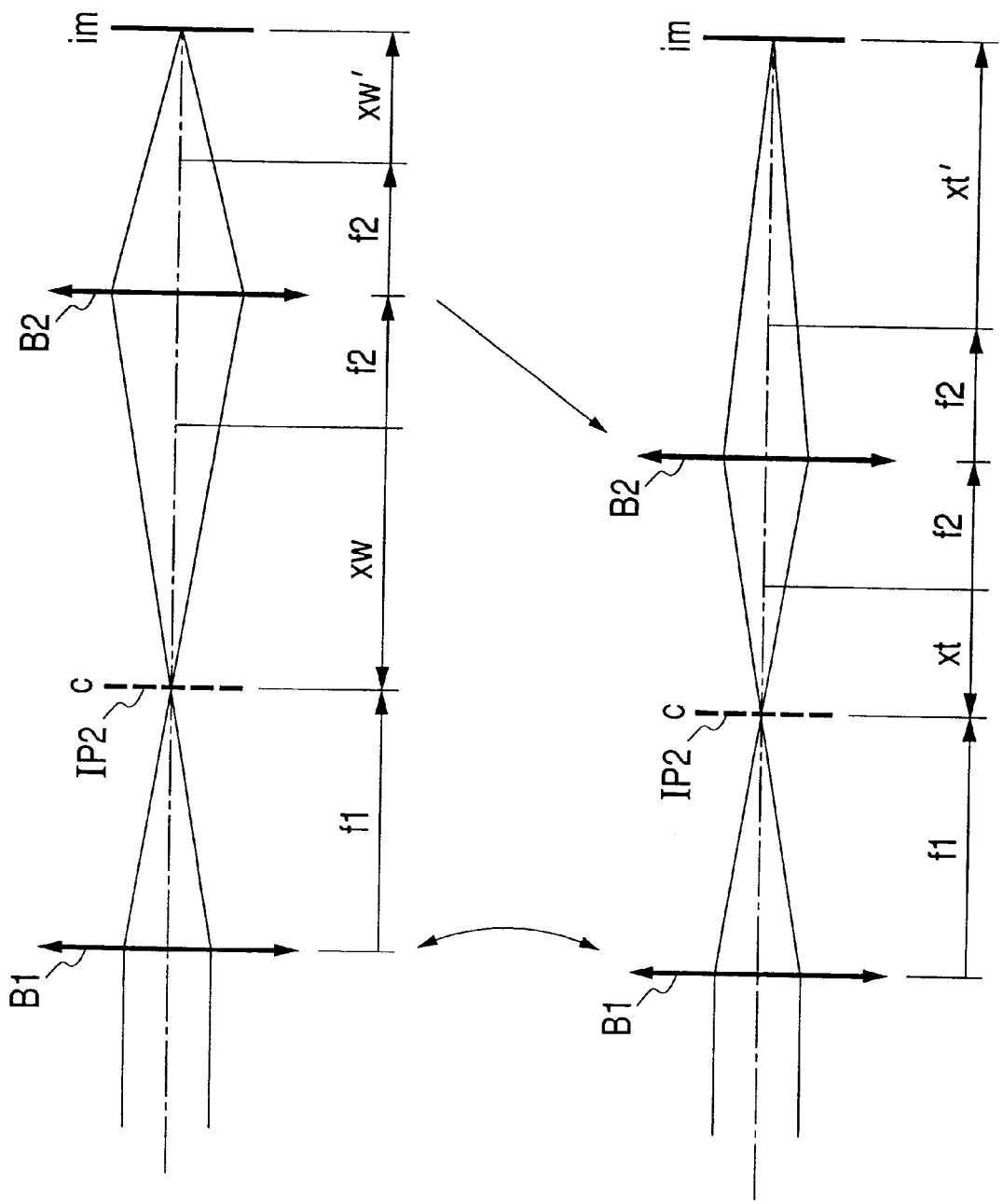
FIGS. 13A and 13B are illustrations of the paraxial refractive power disposition of FIG. 12.

FIG. 12 is a schematic view of the essential portions of Embodiment 11 of the present invention, and FIGS. 13A and 13B are illustrations of the paraxial refractive power arrangement of FIG. 12. This embodiment shows a so-called two-unit type zoom lens using two off-axial optical elements B1 and B2. It also shows a case where a reflecting surface given diffracting action is disposed in a movable lens unit in the zoom lens.

In FIG. 12, B1 and B2 designate first and second optical elements, respectively, having a plurality of curved reflecting surfaces. The first optical element B1 is a lens unit comprising, in succession from the object side, a concave refracting surface s1, four off-axial reflecting surfaces, i.e., a concave mirror sd2, a convex mirror s3, a concave mirror sd4 and a convex mirror s5, and a convex refracting surface sd6, and having a positive refractive power as a whole. The direction of a reference axis entering the first optical element B1 and the direction of a reference axis emerging therefrom are parallel to each other and the same. In this first optical element B1, the refracting surface sd2, the refracting surface sd4 and the refracting surface sd6 are given the diffracting action and are thereby given the action of correcting a rotation-symmetrical aberration component and a rotation-asymmetrical aberration component created by this optical element B1.

The second optical unit B2 is a lens unit comprising, in succession from the object side, a convex refracting surface s7, four off-axial reflecting surfaces, i.e., a convex mirror sd8, a concave mirror sd9, a convex mirror sd10 and a concave mirror sd11, and a convex refracting surface s12, and having a positive refractive power as a whole. As in the first optical element B1, the direction of a reference axis entering the second optical element B2 and the direction of a reference axis emerging therefrom are parallel to each other and the same. In this second optical element B2, the reflecting surfaces sd8, sd9, sd10 and sd11 are given diffracting action and are thereby given the action of correcting a rotation-symmetrical aberration component and a rotation-symmetrical aberration component created by this optical element B2.

Ipf denotes an optical correcting plate comprising a plane parallel plate, or a rock crystal low-pass filter, an infrared cut filter, or the like. Also, im designates an image pickup element surface, or the image pickup surface of a CCD (image pickup medium) or the like. p denotes an aperture disposed on the object side of the first optical element B1.

The imaging action of the present embodiment will now be described. A light beam Ls from an object has its quantity of incident light regulated by the aperture p, whereafter it is refracted by and transmitted through the concave refracting surface s1 of the first optical element B1, repeats reflection on the concave mirror sd2, the convex mirror s3, the concave mirror sd4 and the convex mirror s5 (is also diffracted by the surfaces sd2 and sd4), is subjected to the converging or diverging action by the power of each reflecting mirror, arrives at the convex refracting surface sd6, is refracted and diffracted there and emerges from the first optical element B1. In the first optical element B1, the intermediate image IP1 of the object is once formed on an intermediate imaging plane N1.

It is effective for suppressing an increase in the effective diameter of a ray of light on a surface disposed more adjacent to the image side than to the aperture p that as described above, the object image is once formed in the first optical element B1. The light beam primarily imaged on the primary imaging plane IP1 repeats reflection on the convex mirror s3, the concave mirror sd4 and the convex mirror s5 (is also diffracted by the surface sd4), is subjected to the converging or diverging action by the power of each reflecting mirror, and arrives at the convex refracting surface sd6, and the light beam refracted and diffracted there forms an object image on a secondary imaging plane C (IP2). Thus, the first optical element B1 functions as a lens unit which repeats the refraction by the incidence and emergence surfaces and the reflection by the plurality of curved reflecting mirrors, and is provided with desired optical performance and has positive power as a whole.

The light beam is then transmitted through the convex refracting surface s7 of the second optical element B2, whereafter it is repeatedly subjected to the reflecting and diffracting action by the convex mirror sd8, the concave mirror sd9, the convex mirror sd10 and the concave mirror sd11, is refracted by the convex refracting surface s12 and emerges from the second optical element B2. Again in the second optical element B2, the intermediate image of the object is once formed on an intermediate imaging plane IP3. The light beam which has emerged from the second optical element B2 passes through the optical correcting plate 1pf, and thereafter is imaged on the image pickup element surface im. Thus, the second optical element B2 re-forms the object image formed on the secondary imaging plane C (IP2) by the first optical element B1 on the image pickup element surface im, and like the first optical element B1, it functions as a lens unit which repeats the refraction and diffraction by the incidence and emergence surfaces and the reflection by the plurality of curved reflecting mirrors, and is provided with desired optical performance and has positive power as a whole.

In the present embodiment, the first optical element B1 and the second optical element B2 are moved relative to the imaging plane im, thereby changing the focal length (imaging magnification) of the optical system without changing the final imaging position im. (This is an operation called focal length change or zooming.)

The focal length changing action of the present embodiment will now be described with reference to FIGS. 13A and 13B. FIGS. 13A and 13B are optical arrangement views in each of which the optical elements B1 and B2 of Embodiment 11 is made into a single thin lens and the optical system is developed relative to the reference axis thereof. FIG. 13A is an arrangement view in which the optical system is in the state of the wide angle end (W), and FIG. 13B is an arrangement view in which the optical system is in the state of the telephoto end (T).

The description of the principle of zoom and the calculation expressions for the imaging magnification and focal lengths at the wide angle end (W) and the telephoto end (T) using these figures is entirely the same as the description in Embodiment 5 using FIG. 6 and is therefore omitted.

While in the present embodiment, the secondary imaging plane C (IP2) as the intermediate imaging plane is present intermediately of the first optical element B1 and the second optical element B2, the intermediate imaging plane may be present in the interior of the second optical element B2. The imaging relation of the second optical element B2 holds good with this intermediate imaging position as the object point.

Also, when there are in succession from the object side an optical element having a negative refractive power as a whole and an optical element having a positive refractive power or when there are in succession from the object side an optical element having a positive refractive power as a whole and an optical element having a negative refractive power, the optical elements can be moved relative to each other to thereby change the focal length (imaging magnification) of the photo-taking optical system.

Also, as regards the direction of movement of the optical elements during a focal length change, if the incidence point position of the reference axis of each reflecting surface is not changed during the movement from the wide angle end to the telephoto end, the error occurring during the focal length change can be minimized and therefore, the directions of reference axes entering and emerging from the optical elements B1 and B2 can be made parallel to each other and the optical elements can be moved in parallel along the reference axis lines entering and emerging from the optical elements.

In this case, when optical elements in which the directions of reference axes entering and emerging from the optical elements are parallel to each other are to be constructed, there are conceivable two kinds of patterns, i.e., making the emergence direction the same as the incidence direction as shown in the present embodiment, or making the emergence direction opposite to the incidence direction as shown in the following embodiment. When the emergence direction is made the same as the incidence direction, it becomes possible to shift the positions of the incident reference axis and the emergent reference axis to desired positions. Also, when the emergence direction is made opposite to the incidence direction, the spacing between the incidence side and the emergence side changes by the same amount as the amount of movement with the movement of the optical elements and therefore, it becomes possible to change the length of the optical path by the double of the amount of movement as a whole.

Thus, a zoom optical'system using the off-axial optical system can be constructed in the above-described, two kinds of patterns and therefore, the degree of freedom in optical arrangement can be increased.

However, the direction of movement of the optical elements need not be parallel to the directions of the reference axes entering and emerging from the two optical elements, but for example, the direction of the reference axis entering the optical system and the direction of movement of the movable optical element may form a certain angle such as 30°, 45° or 60° therebetween.

Figure 14:
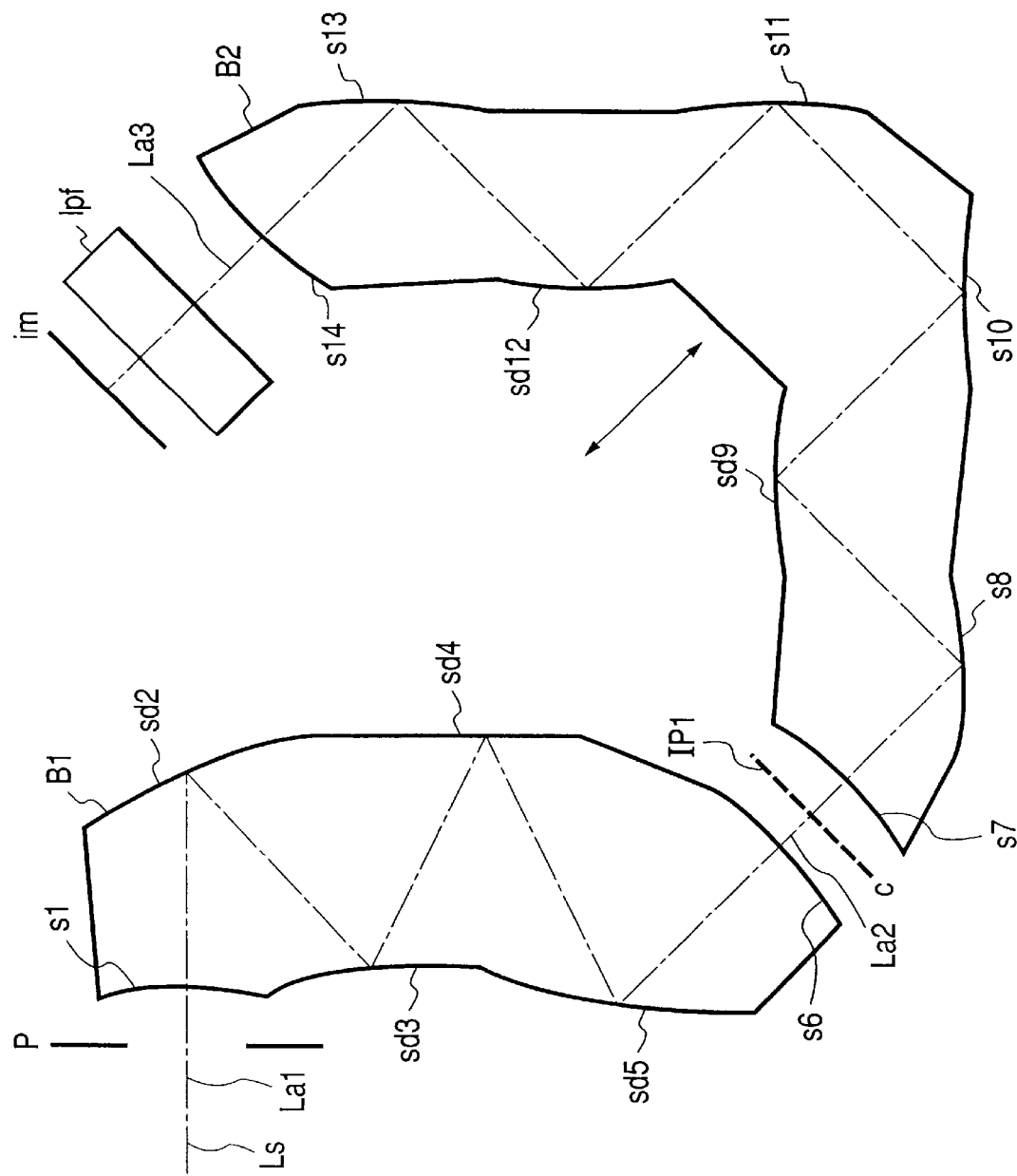
FIG. 14 is a schematic view of the essential portions of Embodiment 12 of the present invention.

FIG. 14 is a schematic view of the essential portions of Embodiment 12 of the present invention. This embodiment shows a so-called two-unit type zoom lens. This embodiment shows a case where the direction, of movement of an optical element B2 moved during a focal length change is not parallel to the direction of the incidence reference axis La1 of an optical element B1 disposed most adjacent to the object side. It also shows a case where a reflecting surface given the diffracting action is disposed in a fixed lens unit in the zoom lens.

In FIG. 14, B1 and B2 designate first and second optical elements, respectively, having a plurality of curved reflecting surfaces. The first optical element B1 is a lens unit comprising, in succession from the object side, a concave refracting surface s1, four reflecting surfaces, i.e., a concave mirror sd2, a convex mirror sd3, a concave mirror sd4 and a concave mirror sd5, and a convex refracting surface s6, and having a positive refractive power as a whole, and becomes a fixed lens unit during zooming. The direction of a reference axis La1 entering the first optical element B1 and the direction of a reference axis La2 emerging therefrom have an inclination of about 45°.

The reflecting surfaces sd2, sd3, sd4 and sd5 are given the diffracting action, and the design is made such that the correction of symmetrical aberrations and asymmetrical aberrations is effected by the use of the degree of freedom of diffraction and the number of constituent surfaces becomes as small as possible. The second optical element B2 is a lens unit comprising, in succession from the object side, a concave refracting surface s7, six reflecting surfaces, i.e., a concave mirror s8, a concave mirror sd9, a convex mirror s10, a concave mirror s11, a concave mirror sd12 and a concave mirror s13 (sd9 and sd12 are also given the diffracting action), and a convex refracting surface s14, and having a positive refractive power as a whole. The direction of a reference axis La2 entering the second optical element B2 and the direction of a reference axis La3 emerging therefrom are parallel and opposite to each other. 1pf designates an optical correcting plate comprising a plane parallel plate, or a rock crystal low-pass filter, an infrared cut filter or the like.

im denotes an image pickup element surface, or the image pickup surface of a CCD (image pickup medium) or the like. p designates an aperture disposed on the object side of the first optical element B1.

The imaging action of the present embodiment will now be described. A light beam Ls from an object has its quantity of incident light regulated by the aperture p, whereafter it is refracted by and transmitted through the concave refracting surface s1 of the first optical element B1, is repeatedly subjected to the reflecting and diffracting action by the concave mirror sd2, the convex mirror sd3, the concave mirror sd4 and the concave mirror sd5, is subjected to the converging or diverging action by the power of each reflecting mirror, and arrives at the convex refracting surface s6, and the light beam refracted there forms an object image on an intermediate imaging plane IP1. In the first optical element B1 as well, the intermediate image of the object is once formed.

The light beam from the object image on the intermediate imaging plane IP1 is transmitted through the concave refracting surface s7 of the second optical element B2, whereafter it is subjected to the reflecting action by the concave mirror s8, the concave mirror sd9, the convex mirror s10, the concave mirror s11, the concave mirror sd12 and the concave mirror s13 (the surfaces sd9 and sd12 are also given the diffracting action), and thereafter is reflected by the convex refracting surface s14 and emerges from the second optical element B2. In the second optical element 12 as well, the intermediate image of the object is once formed.

The light beam which has emerged from the second optical element B2 passes through the optical correcting plate 1pf, whereafter it is imaged on the image pickup element surface im.

In the present embodiment, focusing to different object distances is effected by moving the second optical element B2. At this time, the second optical element B2 is moved parallel to the direction of the reference axis La2 emerging from the first optical element B1, but the direction of the reference axis La1 entering the first optical element B1 and the direction of the reference axis La2 emerging therefrom form an inclination of about 45° and thus, the direction in which the second optical element B2 is moved during focusing is inclined by about 45° with respect to the direction of the reference axis La1 entering the first optical element B1.

Accordingly, the second optical element B2, during focusing, is moved parallel to the directions of the reference axes entering and emerging from the second optical element, but is moved with an inclination of 45° with respect to the direction of the reference axis entering the first optical element B1.

Again in the present embodiment as in Embodiment 11, the first and second optical elements B1 and B2 are moved relative to the imaging plane in to thereby change the imaging magnification of the optical system. However, unlike Embodiment 11 in which the directions of the reference axes entering and emerging from each optical element and the directions of movement of the optical elements are all parallel to each other, the direction of the reference axis entering the first optical element B1 and the direction of the reference axis emerging therefrom form an inclination of 45° and therefore, in order to maintain the direction of the reference axis entering the second optical element B2 from the first optical element B1 during the focal length changing operation, the direction of movement of the first optical element B1 is made parallel to the direction of the reference axis entering the second optical element B2.

Figure 15:
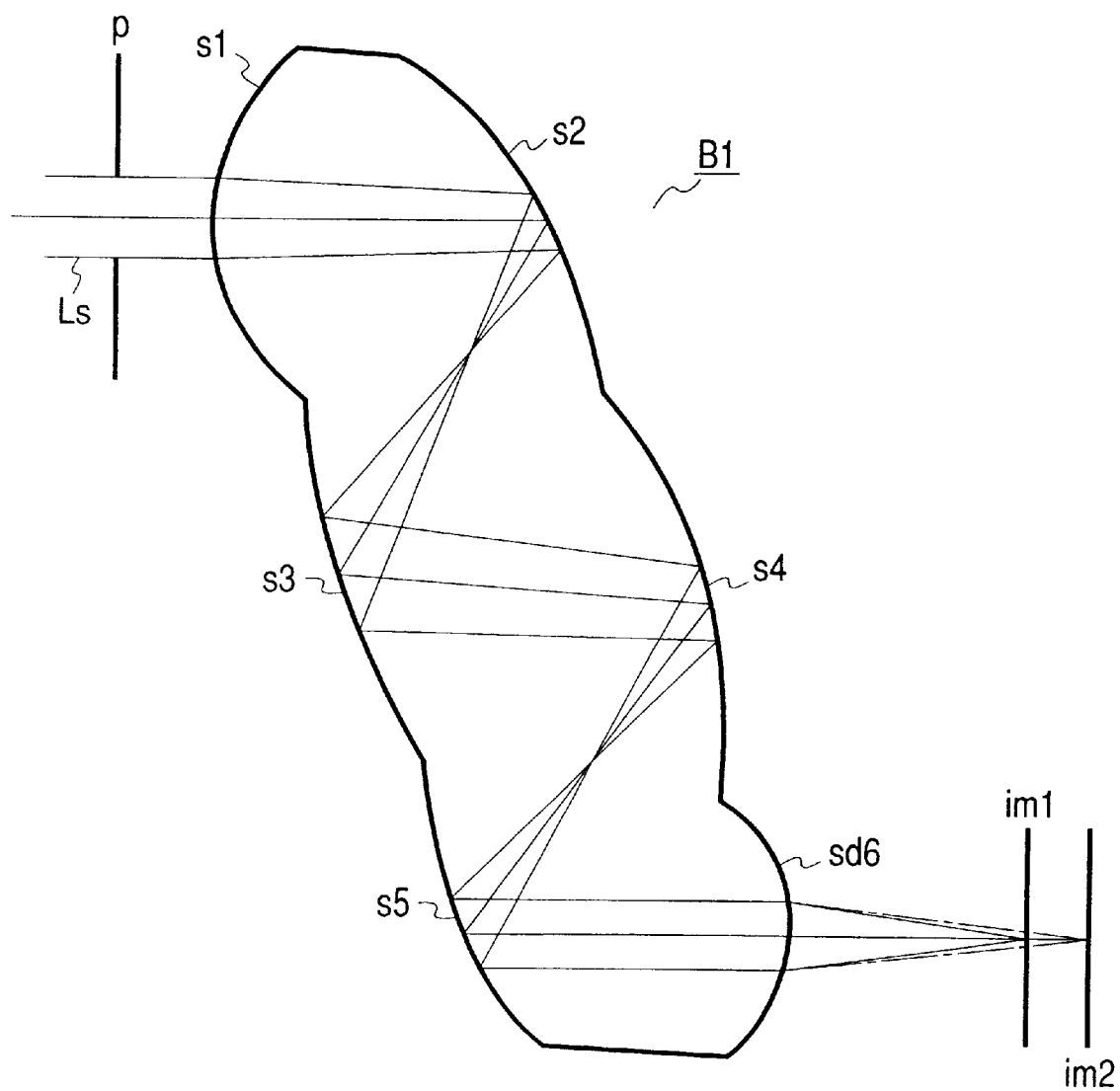
FIG. 15 is a schematic view of the essential portions of Embodiment 13 of the present invention.

FIG. 15 is a schematic view of the essential portions of Embodiment 13 of the present invention. In the optical system of this embodiment, a light beam Ls from an object surface at infinity passes through an aperture P, whereafter it enters an optical element B1 comprising four reflecting surfaces being integrally molded. In this optical element B1, reflecting surfaces s2, s3, s4 and s5 are off-axial curved surfaces (curved surfaces in which a reference axis formed by the optical path of a ray of light of a reference wavelength passing through the center of the aperture P and the center of the image plane im and the plane normal at a point of intersection do not coincide with each other) and therefore, this optical element is an off-axial optical element.

In this embodiment, the emergence refracting surface sd6 of this off-axial optical element is given the diffracting action, and a multi-focus optical system (in this figure, a two-focus optical system) is constructed by the difference in the diffraction order thereof.

In this figure, the optical system is a multi-focus optical system in which by the difference in the order of diffraction (e.g. 0-order and 1st-order diffracted lights) on the emergence surface sd6, the ray of light is imaged on different image planes (in this figure, two image planes im 1 and im 2) in accordance with the diffraction efficiency of the order thereof. To give surfaces the diffracting action, a method of attaching to these surfaces a hologram having rotation-symmetrical stripes or a method of making a kinoform on the shape of a surface is applicable.

As the method of making a kinoform on the shape of a surface, there is a method of brazing by the use of a minute turning tool, a method of attaching grid stripes of the binary type as shown in FIG. 19B by the technique of lithography, or the like. When it is desired to make such a kinoform type in a great deal and inexpensively, it may be made by making stripes in advance on a mold by the use of a method of brazing by the use of a minute turning tool or the technique of lithography, and transferring the shape thereof when an optical element is to be formed of glass or plastic.

When the diffracting surface thereof is to be made, it is desirable to optimize the shape of the grid stripes so that the diffracting efficiency of the desired order can be increased.

Figure 16:
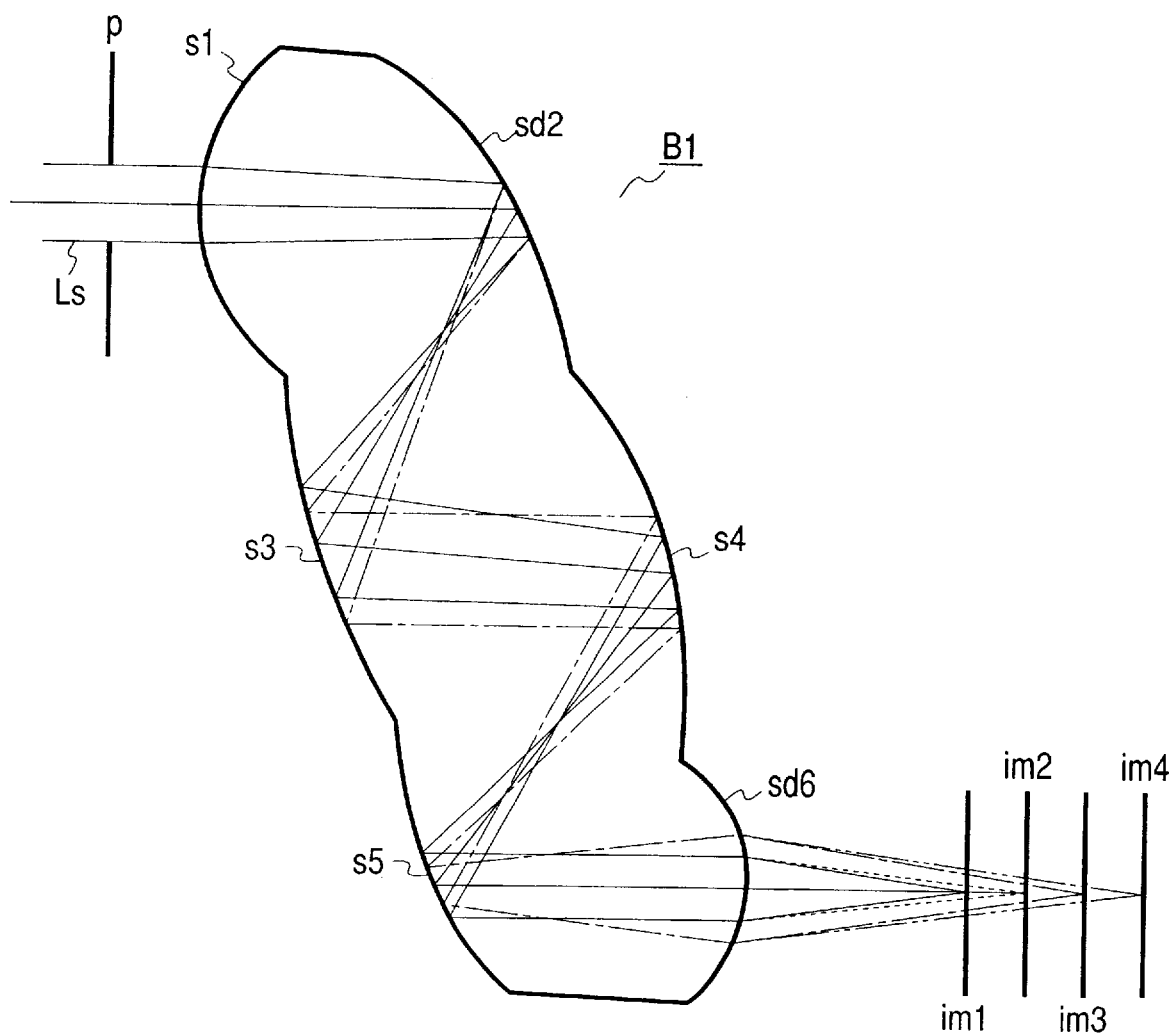
FIG. 16 is a schematic view of the essential portions of Embodiment 14 of the present invention.

FIG. 16 is a schematic view of the essential portions of Embodiment 14 of the present invention. In the optical system of this embodiment, a light beam Ls from an object surface at infinity passes through an aperture P, whereafter it enters an optical element B1 comprising four reflecting surfaces being integrally molded. In this optical element B1, reflecting surfaces sd2, s2, s3, s4 and s5 are off-axial curved surfaces (curved surfaces in which a reference axis formed by the optical path of a ray of light of a reference wavelength passing through the center of the aperture P and the center of the image plane im and the normal plane at a point of intersection do not coincide with each other) and therefore, this optical element is an off-axial optical element.

In this embodiment, the reflecting surface sd2 and emergence refracting surface sd6 of this off-axial element are given the diffracting action, and by the difference in the order of diffraction thereof, a multi-focus optical system (in this figure, a four-focus optical system) is constructed.

As the surfaces thus given the diffracting action and dividing the light beam, use can be made of not only refracting surfaces but also reflecting surfaces. In this figure, the optical system is a multi-focus optical system in which by the difference in the order of diffraction (e.g. 0-order and 1st-order diffracted lights) on the surface sd2 and the surface sd6, the ray of light is imaged on different image planes (in this figure, four image planes im 1, im 2, im 3 and im 4) in accordance with the diffracting efficiency of the order thereof. To give surfaces the diffracting action, a method of attaching to these surfaces a hologram having rotation-asymmetrical stripes or a method of making a kinoform on the shape of a surface is applicable.

As the method of making a kinoform on the shape of a surface, there is a method of brazing by the use of a minute turning tool, a method of attaching grid stripes of the binary type as shown in FIG. 19B by the technique of lithography, or the like. When it is desired to make such a kinoform type in a great deal and inexpensively, it may be made by making stripes in advance on a mold by the use of a method of brazing by the use of a minute turning tool or the technique of lithography, and transferring the shape thereof when an optical element is to be formed of glass or plastic. When the diffracting surface thereof is to be made, it is desirable to optimize the shape of grid stripes so that the diffracting efficiency of a desired order can be increased.

Figure 17:
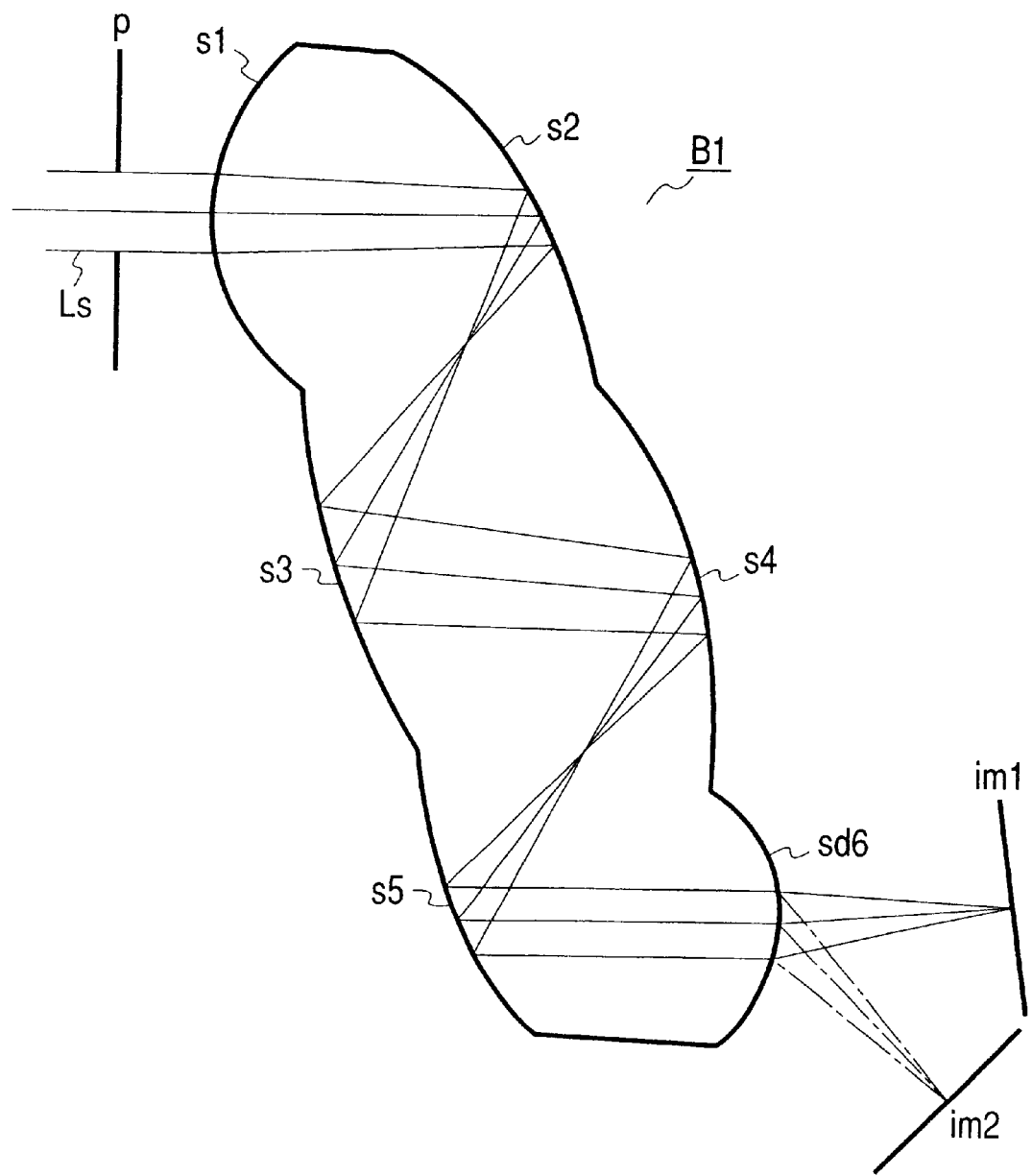
FIG. 17 is a schematic view of the essential portions of Embodiment 15 of the present invention.

FIG. 17 is a schematic view of the essential portions of Embodiment 15 of the present invention. In the optical system of this embodiment, a light beam Ls from an object surface at infinity passes through an aperture P, whereafter it enters an optical element B1 comprising four reflecting surfaces being integrally molded. In this optical element, reflecting surfaces s2, s3, s4 and s5 are off-axial curved surfaces (curved surfaces in which a reference axis formed by the optical path of a ray of light of a reference wavelength passing through the center of the aperture P and the center of the image plane im and the plane normal at a point of intersection do not coincide with each other) and therefore, this optical element B1 is an off-axial optical element. In this embodiment, the emergence refracting surface sd6 of this off-axial optical element is given the diffracting action, and by the difference in the order of diffraction thereof, a multi-focus optical system (in this figure, a two-focus optical system) is constructed.

In this figure, the optical system is a multi-focus optical system in which by the difference in the order of diffraction (e.g. 0-order and 1st-order diffracted lights) on the emergence surface sd6, rays of light assume different optical paths in accordance with the diffracting efficiency of the order thereof, and are imaged on respective image planes (in this figure, two image planes im 1 and im 2).

The difference of the present embodiment from Embodiment 13 is that multiple image planes (in this embodiment, two image planes im 1 and im 2) are not on the same axis, but are obtained separately from each other. In diffraction, it is possible by changing the shape of stripes on the surface to make such an off-axial system. To give surfaces the diffracting action, a method of attaching to these surfaces a hologram having rotation-asymmetrical stripes, or a method of making a kinoform on a surface of a certain shape is applicable.

As the method of making a kinoform on a surface of a certain shape, there is a method of brazing by the use of a minute turning tool, a method of attaching grid stripes of the binary type as shown in FIG. 19B by the technique of lithography, or the like. When it is desired to make such a kinoform type in a great deal and inexpensively, it may be made by making stripes in advance on a mold by the use of the method of brazing by the use of a minute turning tool or the technique of lithography, and transferring the shape thereof when an optical element is to be formed of glass or plastic. When the diffracting surface is to be made, it is desirable to optimize the shape of the grid stripes so that the diffracting efficiency of a desired order can be increased.

As described above, at least one surface of an optical element having a plurality of reflecting surfaces and refracting surfaces comprising off-axial curved surfaces is given the diffracting action, whereby there can be achieved an optical element and an optical system in which the degree of freedom of design in aberration correction when an object image is formed on a predetermined surface is increased and the compactness of the entire optical system is achieved and yet high optical performance is easily obtained.

The constituent surfaces (refracting surfaces and reflecting surfaces) of an off-axial optical element constituting an off-axial optical system are given the diffracting action, whereby the degree of freedom of design can be increased and aberration correction becomes possible by a small number of surfaces, and this is effective for downsizing and lighter weight. Also, the diffracting action is given the correction of rotation-asymmetrical aberrations, whereby there can be provided a rotation-symmetrical surface easy to make as the surface shape of a base, and this leads to the ease of manufacture.

Also, even if some or all of the incidence surface, a plurality of off-axial reflecting surfaces having a curvature and the emergence surface are made into surfaces which cause the diffracting action in an off-axial optical element for forming the image of an object surface on an image plane, those surfaces can be molded simultaneously and integrally with the molding of the off-axial surfaces and therefore, like the surface shape, the relative position accuracy of the surfaces which cause the diffracting action can be enhanced.

Also, by changing the relative position of a plurality of off-axial elements including surfaces having the diffracting action, a compact zoom optical system can be constructed.

Also, by utilizing the diffracting action for the separation of light beams, a compact multi-focus optical system can be constructed.

What is claimed is:

1. An optical element of transparent optical material, said optical element comprising:

an incidence surface on which a light beam is incident;

one or more reflecting surfaces reflecting the light beam incident on said incidence surface, said one or more reflecting surfaces having an off-axial curved surface; and an emergence surface from which the light beam reflected by said one or more reflecting surfaces emerges, wherein at least one of said incidence surface, said emergence surface and said one or more reflecting surfaces is a surface having rotation-asymmetrical diffracting action, and said surface having the rotation-asymmetrical diffracting action being a rotation-symmetrical curved surface.

2. An optical element according to claim 1, wherein said surface having the diffracting action is a spherical surface.

3. An optical element according to claim 1, wherein said surface having the diffracting action is a rotation-symmetrical aspherical surface.

4. An optical element according to claim 1, wherein said surface having the diffracting action is a hologram type diffracting surface.

5. An optical element according to claim 1, wherein said surface having the diffracting action is a kinoform type diffracting surface.

6. An optical element according to claim 1, wherein said surface having the diffracting action is a binary type diffracting surface.

7. An optical element according to claim 1, wherein said surface having the diffracting action is a diffracting surface comprising rotation-asymmetrical stripes.

8. An optical element according to claim 2, wherein said surface having the diffracting action is a diffracting surface comprising rotation-asymmetrical stripes.

9. An optical element according to claim 3, wherein said surface having the diffracting action is a diffracting surface comprising rotation-asymmetrical stripes.

10. An optical element according to claim 4, wherein said surface having the diffracting action is a diffracting surface comprising rotation-asymmetrical stripes.

11. An optical element according to claim 5, wherein said surface having the diffracting action is a diffracting surface comprising rotation-asymmetrical stripes.

12. An optical element according to claim 6, wherein said surface having the diffracting action is a diffracting surface comprising rotation-asymmetrical stripes.

13. An optical element according to claim 1, wherein an optical path is divided into a plurality by the order of the diffracting action of said surface having the diffracting action.

14. An optical element according to claim 1 wherein an optical path is divided into a plurality by the order of the diffracting action of said surface having the diffracting action.

15. An optical element according to claim 2, wherein an optical path is divided into a plurality by the order of the diffracting action of said surface having the diffracting action.

16. An optical element according to claim 3, wherein an optical path is divided into a plurality by the order of the diffracting action of said surface having the diffracting action.

17. An optical element according to claim 4, wherein an optical path is divided into a plurality by the order of the diffracting action of said surface having the diffracting action.

18. An optical element according to claim 5, wherein an optical path is divided into a plurality by the order of the diffracting action of said surface having the diffracting action.

19. An optical element according to claim 6, wherein an optical path is divided into a plurality by the order of the diffracting action of said surface having the diffracting action.

20. An optical element according to claim 1, which has a plurality of focal lengths differing from one another by the order of the diffracting action of said surface having the diffracting action.

21. An optical element according to claim 1, which has a plurality of focal lengths differing from one another by the order of the diffracting action of said surface having the diffracting action.

22. An optical element according to claim 2, which has a plurality of focal lengths differing from one another by the order of the diffracting action of said surface having the diffracting action.

23. An optical element according to claim 3, which has a plurality of focal lengths differing from one another by the order of the diffracting action of said surface having the diffracting action.

24. An optical element according to claim 4, which has a plurality of focal lengths differing from one another by the order of the diffracting action of said surface having the diffracting action.

25. An optical element according to claim 5, which has a plurality of focal lengths differing from one another by the order of the diffracting action of said surface having the diffracting action.

26. An optical element according to claim 6, which has a plurality of focal lengths differing from one another by the order of the diffracting action of said surface having the diffracting action.

27. An optical system constituted by one or more optical elements, and provided with at least one optical element according to claim 1.

28. An optical system according to claim 27 in which the focal length of the entire system is changed by said optical element being moved.

29. An optical system according to claim 28, wherein said optical element is moved along a reference axis.

30. An optical system according to claim 27, which is provided with a coaxial optical element.

31. An optical system according to claim 30, wherein the focal length of the entire system is changed by said coaxial optical element being moved.

32. An optical system according to claim 31, wherein said coaxial optical element is moved along a reference axis.

33. An optical element of transparent optical material, said optical element comprising:

an incidence surface on which light is incident;

one or more reflecting surfaces reflecting light from said incident surface, said one or more reflecting surfaces having an off-axial curved surface; and an emergence surface from which the light reflected by said one or more reflecting surfaces emerges, at least one of said incidence surface, said emergence surface and said one or more reflecting surfaces being a surface having a rotation-asymmetrical diffraction action, said rotation-asymmetrical diffraction-action surface having rotation-asymmetrical stripes for diffracting the light incident thereon, said surface having the rotation-asymmetrical diffracting action being a rotation-symmetrical curved surface.

34. An optical system having an optical element according to claim 33.

* * * * *

UNITED STATES PATENT AND TRADEMARK OFFICE
CERTIFICATE OF CORRECTION

PATENT NO.    : 6,351,333 B2
DATED         : February 26, 2002
INVENTOR(S)   : Keisuke Araki et al.

It is certified that error appears in the above-identified patent and that said Letters Patent is hereby corrected as shown below:

<u>Title page,</u>
Item [56], References Cited: OTHER PUBLICATIONS: "JP-197337" should read -- JP 9-197337 --.

<u>Drawings,</u>
Sheet No. 2: Figure 17, "sd6" should read -- s6 --.

<u>Column 1,</u>
Line 14, "at where" should read -- at which --.
Line 29, "at where" should read -- at which --.

<u>Column 2,</u>
Line 29, "emergence surface" should read -- emergence surface, --.

<u>Column 4,</u>
Line 40, "at where" should read -- at which --.

<u>Column 5,</u>
Line 59, "system" should read -- system; --.
Line 64, "plane" should read -- plane. --.

<u>Column 6,</u>
Line 19, the space after "(a•b)}-{" should be deleted.

<u>Column 20,</u>
Line 59, "optical'system" should read -- optical system --.
Line 60, "above-described," should read -- above-described --.

<u>Column 25,</u>
Line 64, "claim 1" should read -- claim 1, --.

UNITED STATES PATENT AND TRADEMARK OFFICE
CERTIFICATE OF CORRECTION

PATENT NO. : 6,351,333 B2
DATED : February 26, 2002
INVENTOR(S) : Keisuke Araki et al.

It is certified that error appears in the above-identified patent and that said Letters Patent is hereby corrected as shown below:

Column 26,
Line 54, "claim 27" should read -- claim 27, --.

Signed and Sealed this

Twenty-third Day of July, 2002

Attest:

Attesting Officer

JAMES E. ROGAN
*Director of the United States Patent and Trademark Office*